Dec. 2, 1952
G. VALENSI
2,620,394
HIGH-SPEED TELEGRAPHIC SYSTEM
Original Filed Oct. 23, 1945
19 Sheets-Sheet 1
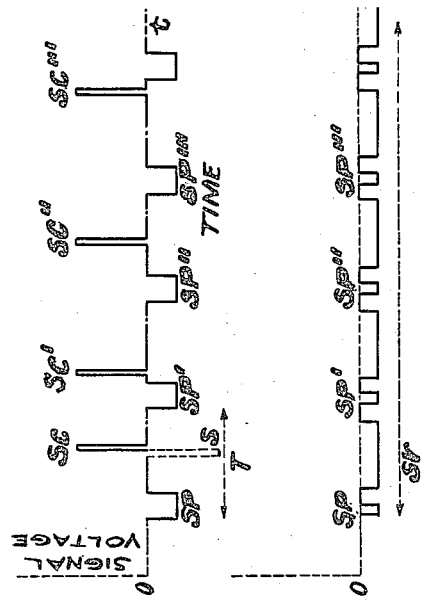
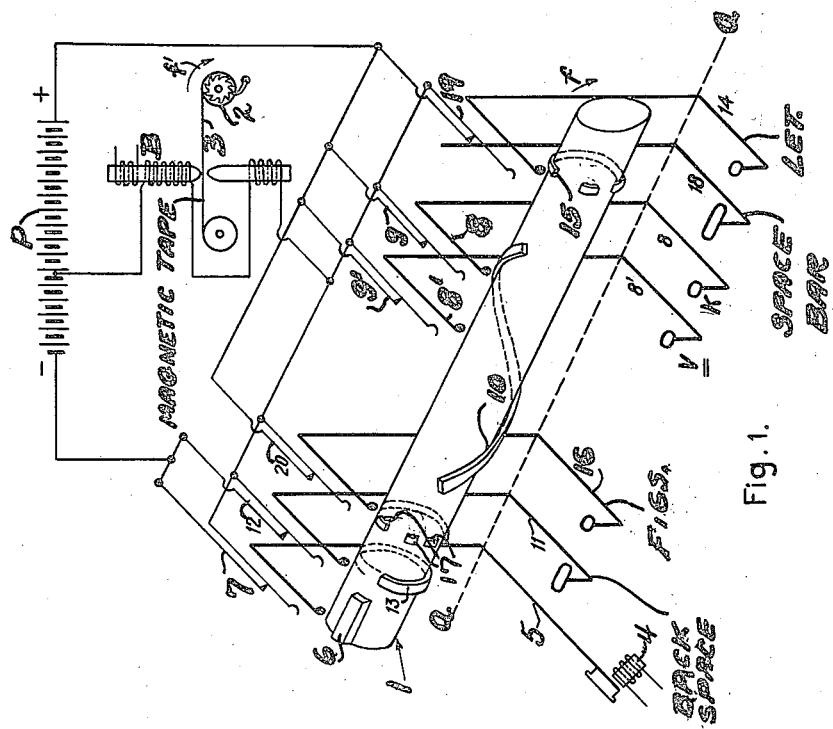
INVENTOR
GEORGES VALENSI
By A.D. Adams
ATTORNEY

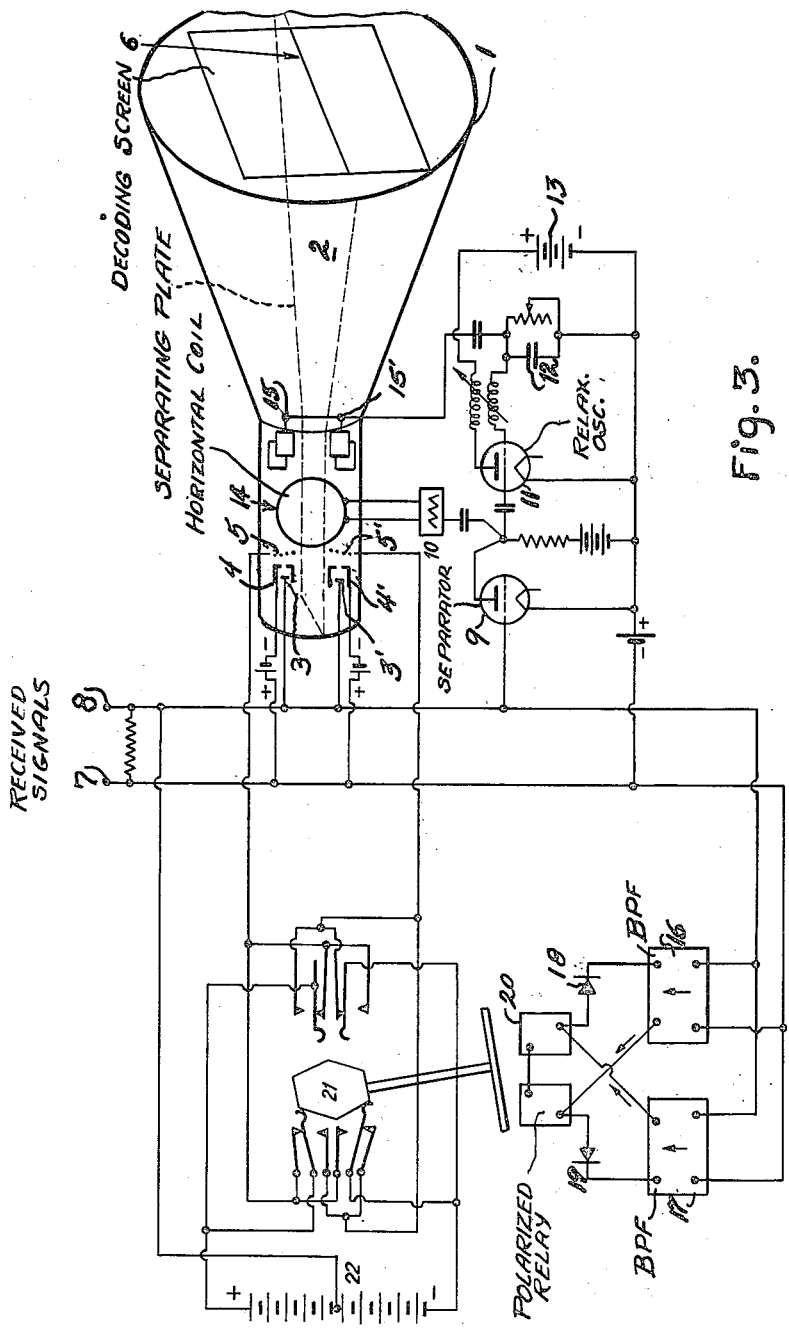

Dec. 2, 1952            G. VALENSI            2,620,394
HIGH-SPEED TELEGRAPHIC SYSTEM
Original Filed Oct. 23, 1945            19 Sheets-Sheet 3
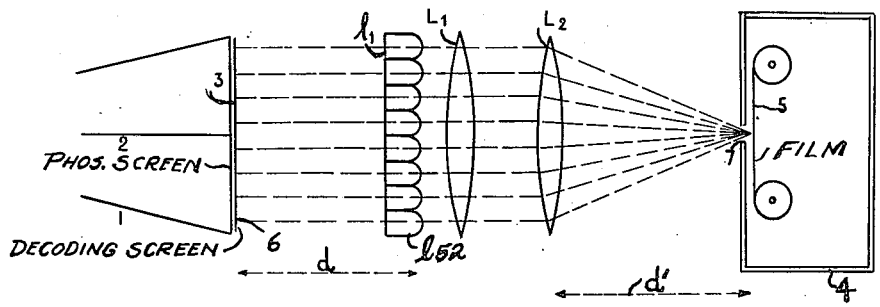
Fig. 4.
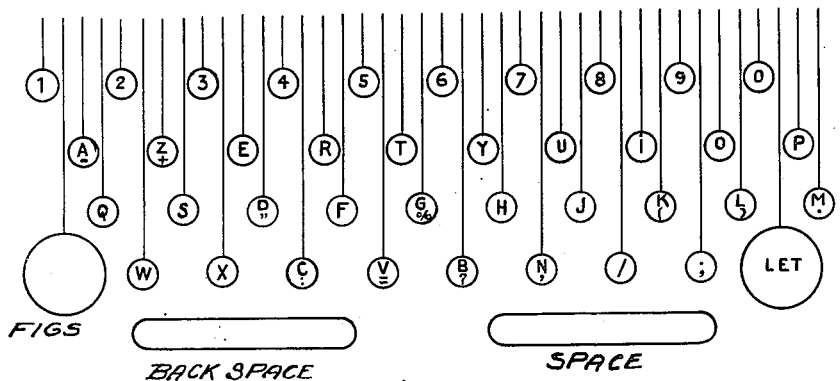
Fig. 5.
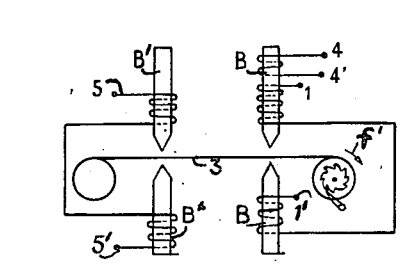
Fig. 6.
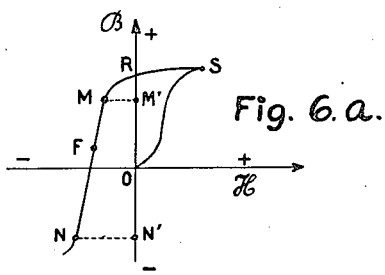
Fig. 6.a.
INVENTOR
GEORGES VALENSI
By *A. D. Adams*
ATTORNEY

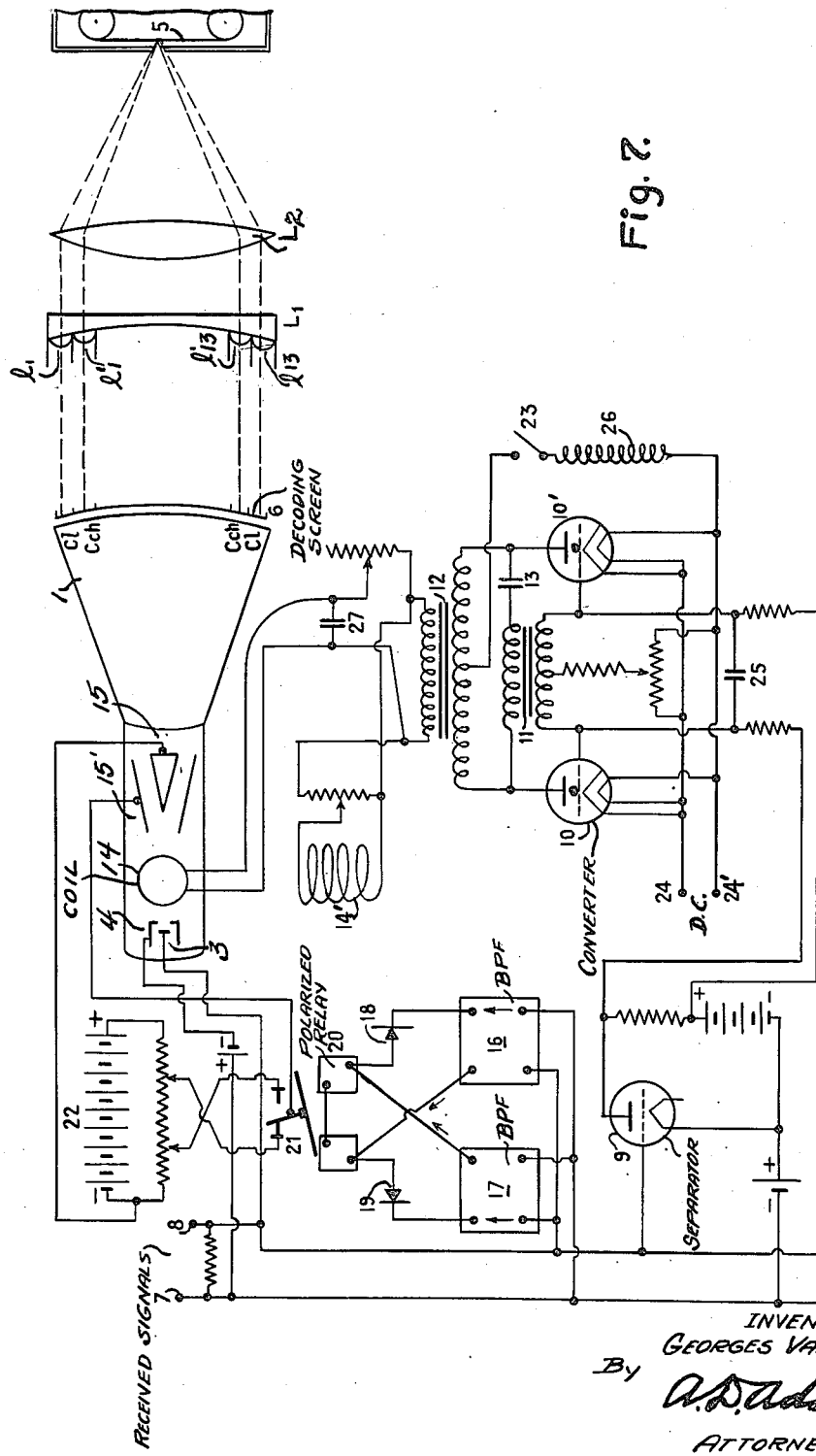

Dec. 2, 1952  G. VALENSI  2,620,394
HIGH-SPEED TELEGRAPHIC SYSTEM
Original Filed Oct. 23, 1945  19 Sheets-Sheet 5
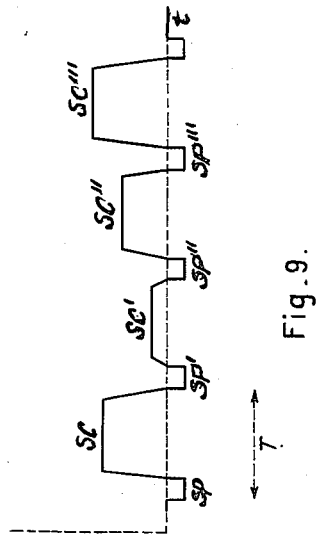
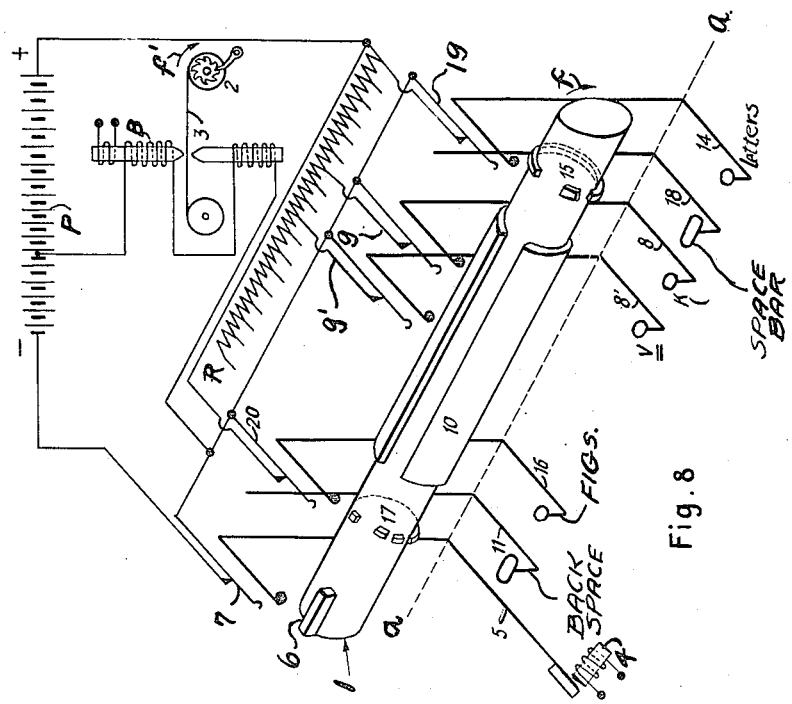
INVENTOR
GEORGES VALENSI
By A. D. Adams
ATTORNEY Dec. 2, 1952          G. VALENSI          2,620,394
HIGH-SPEED TELEGRAPHIC SYSTEM
Original Filed Oct. 23, 1945          19 Sheets—Sheet 7
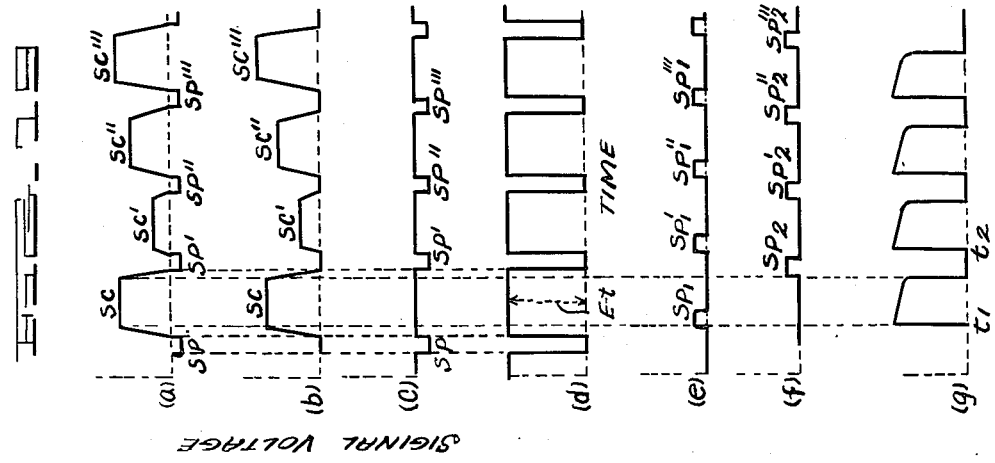
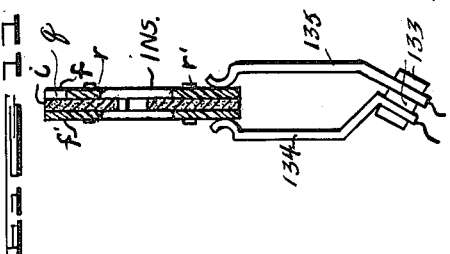
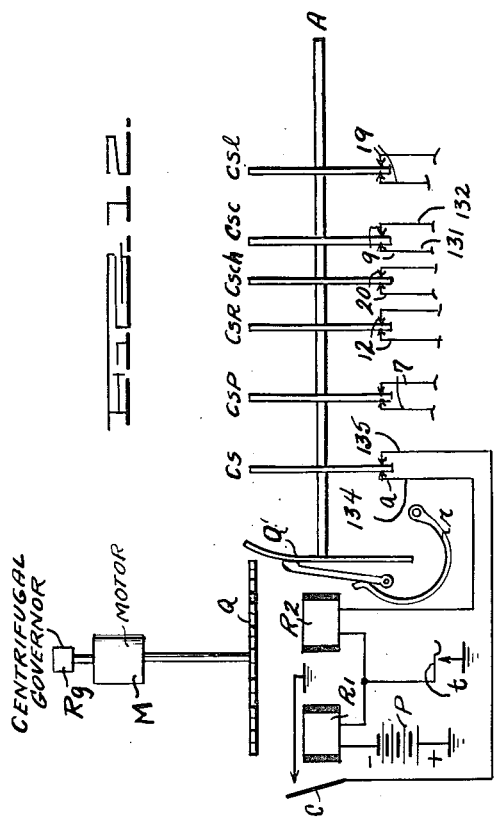
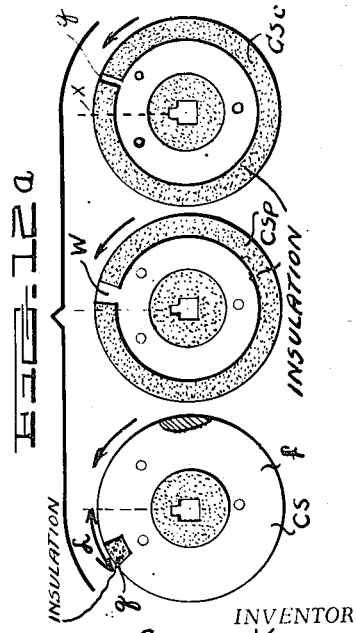
INVENTOR.
GEORGES VALENSI
BY
ATTORNEY Dec. 2, 1952 G. VALENSI 2,620,394
HIGH-SPEED TELEGRAPHIC SYSTEM
Original Filed Oct. 23, 1945 19 Sheets-Sheet 9

INVENTOR
GEORGES VALENSI
By A.D. Adams
ATTORNEY

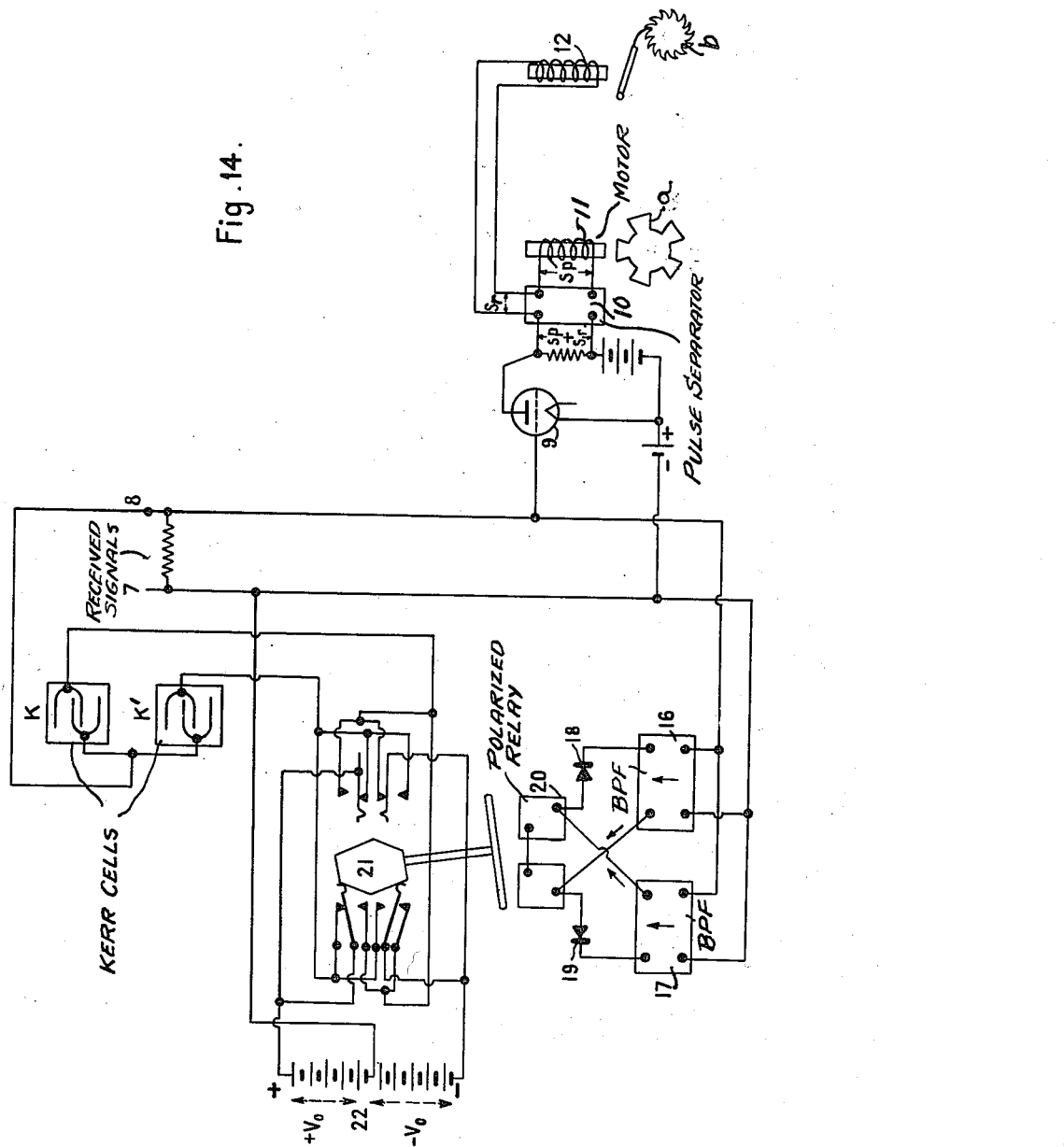

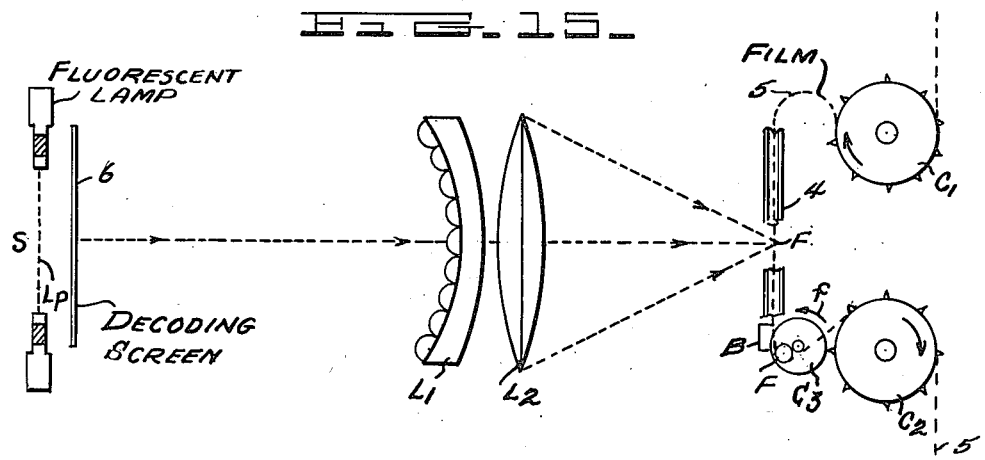
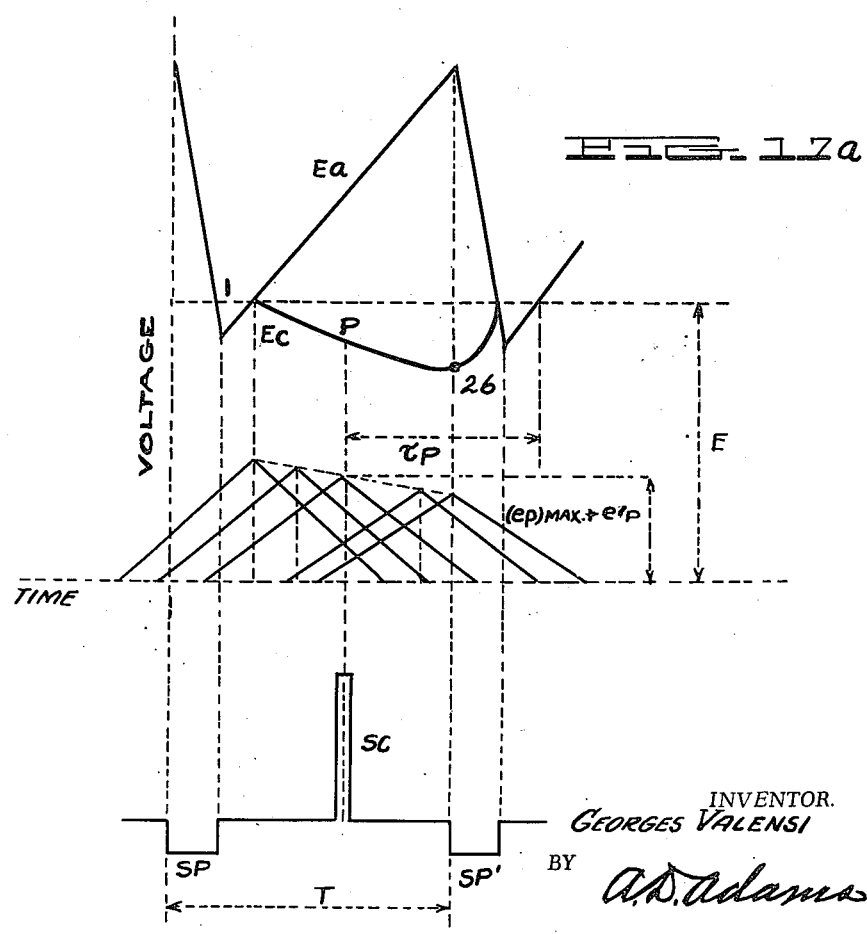

Dec. 2, 1952        G. VALENSI        2,620,394

HIGH-SPEED TELEGRAPHIC SYSTEM

Original Filed Oct. 23, 1945        19 Sheets-Sheet 12

INVENTOR
GEORGES VALENSI
By A. D. Adams
ATTORNEY

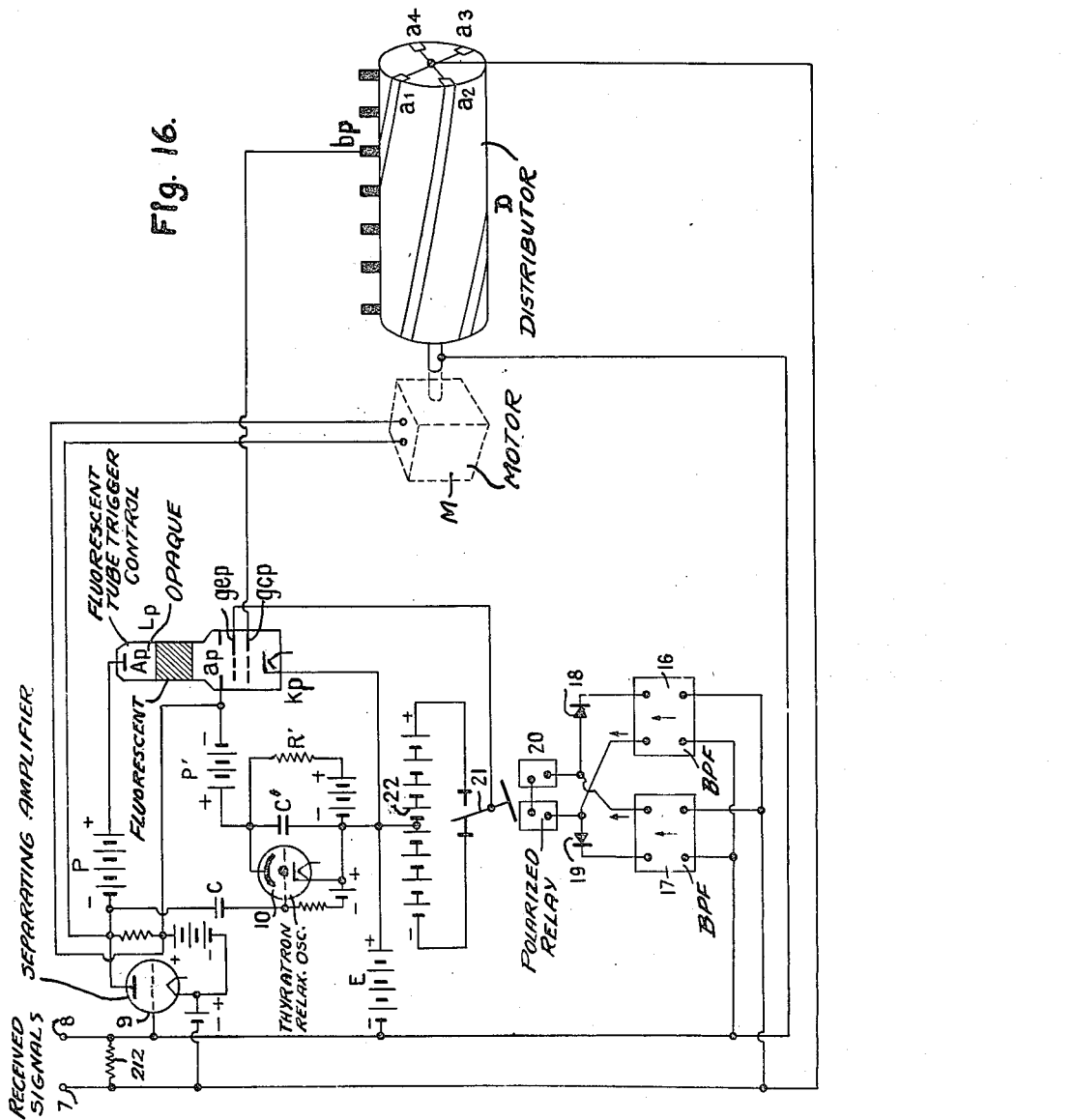

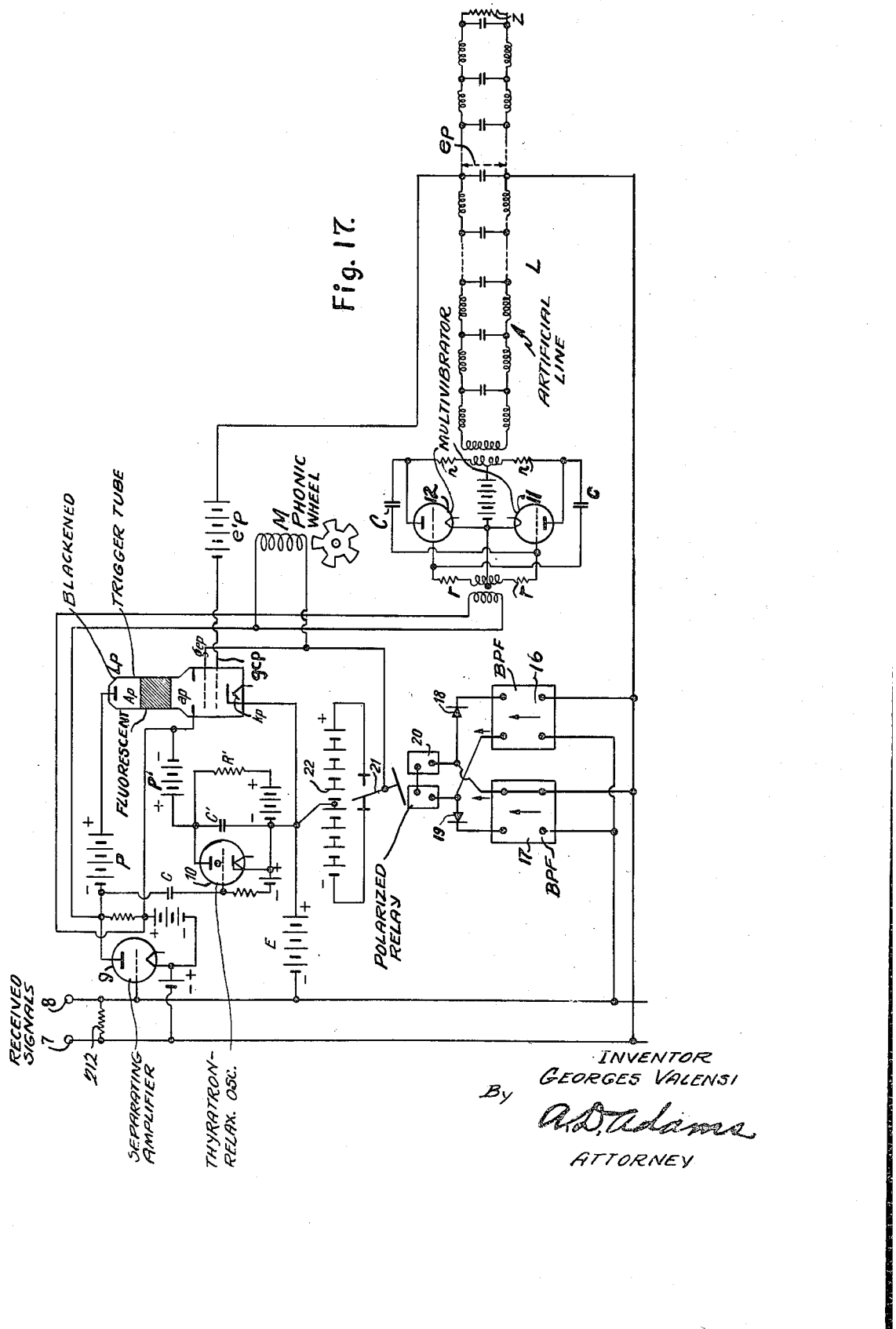

Dec. 2, 1952   G. VALENSI   2,620,394
HIGH-SPEED TELEGRAPHIC SYSTEM
Original Filed Oct. 23, 1945   19 Sheets-Sheet 15
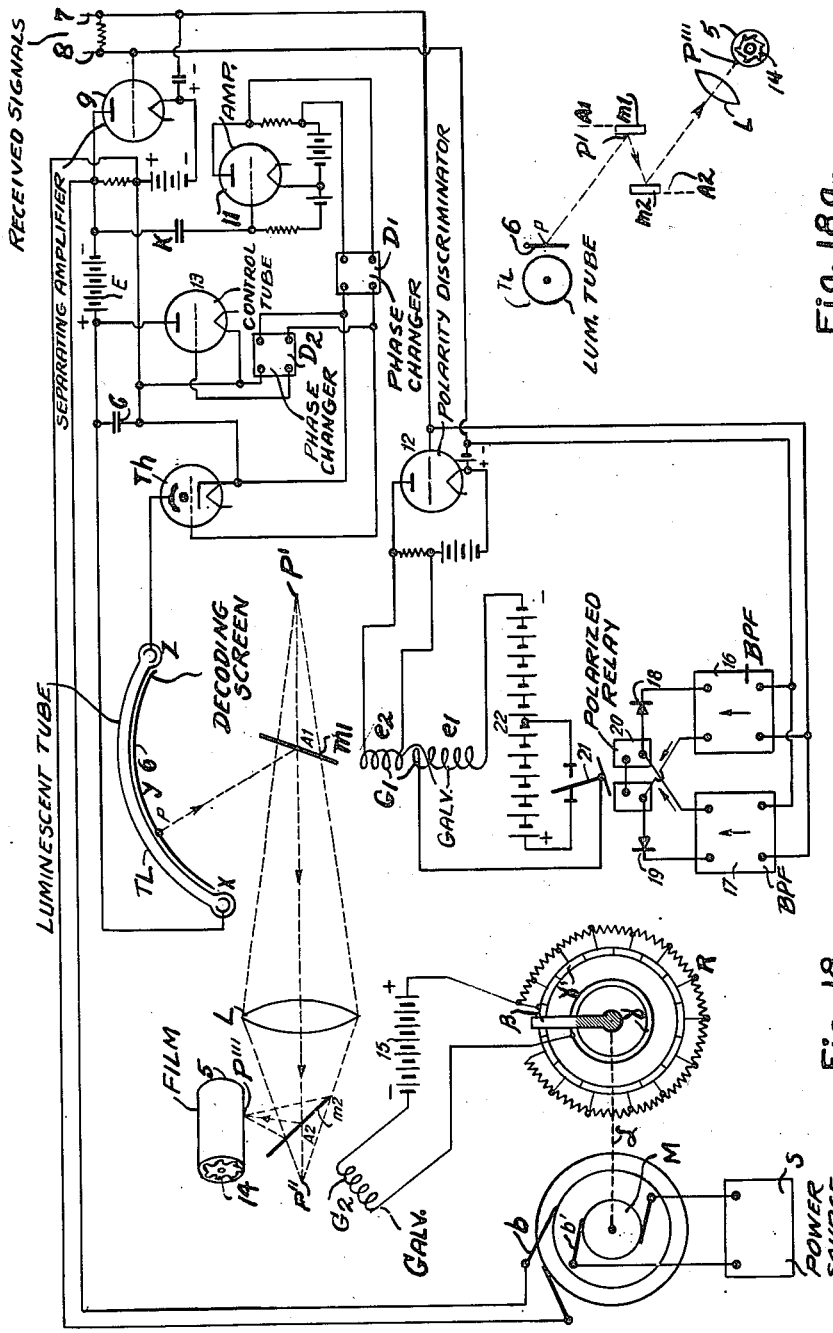
INVENTOR
GEORGES VALENSI
By A.D. Adams
ATTORNEY Dec. 2, 1952 G. VALENSI 2,620,394
HIGH-SPEED TELEGRAPHIC SYSTEM
Original Filed Oct. 23, 1945 19 Sheets-Sheet 16

INVENTOR
GEORGES VALENSI
By A.D. Adams
ATTORNEY

Dec. 2, 1952   G. VALENSI   2,620,394
HIGH-SPEED TELEGRAPHIC SYSTEM
Original Filed Oct. 23, 1945   19 Sheets-Sheet 17

INVENTOR
GEORGES VALENSI
By
ATTORNEY

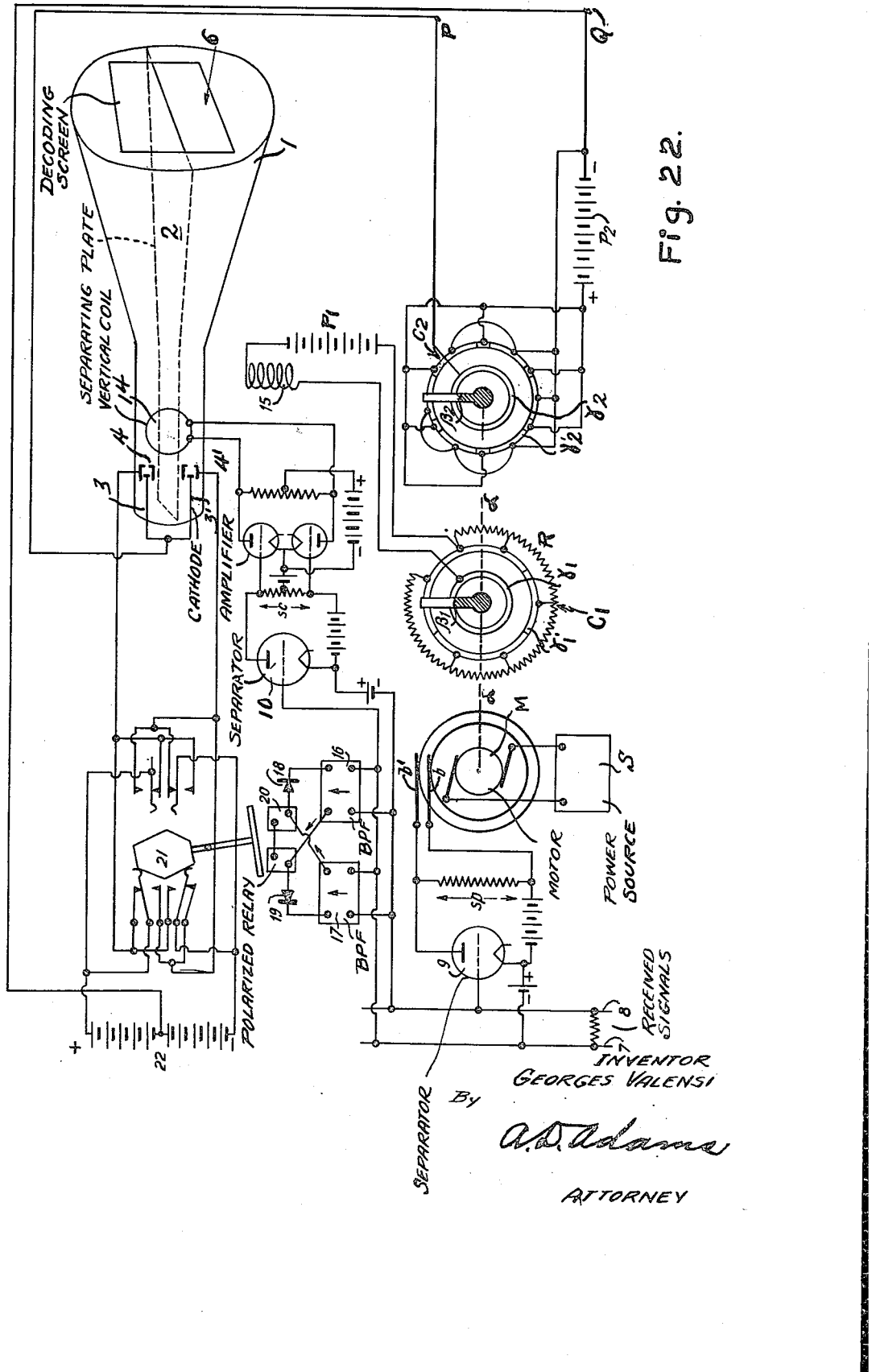

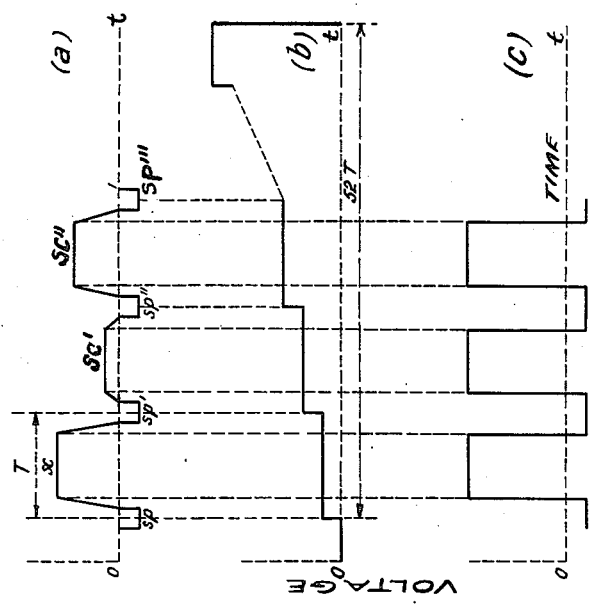
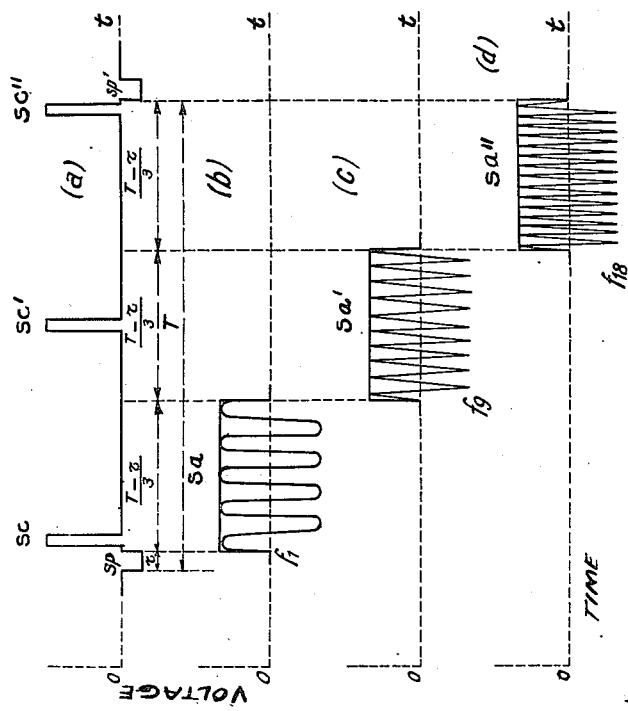

Patented Dec. 2, 1952

2,620,394

UNITED STATES PATENT OFFICE 2,620,394

HIGH-SPEED TELEGRAPHIC SYSTEM

Georges Valensi, Paris, France

Continuation of application Serial No. 623,941, October 23, 1945. This application March 3, 1950, Serial No. 147,463. In France April 17, 1943

Section 1, Public Law 690, August 8, 1946
Patent expires April 17, 1963

7 Claims. (Cl. 178—15)

This invention relates to high speed telegraphic system and apparatus therefor and has as one object the provision of high speed telegraphy system characterised by the fact that it includes: a preliminary recording of the telegraphic signals in a manner which is independent of the rhythm or timing of their subsequent transmission, a high speed transmission of the recorded signals over a telephonic channel and their reception and subsequent recording upon photographic film by means of an electro-optical relay synchronised by the manner of transmission. Other important features of the system will become apparent in the course of the description of various embodiments which is given hereafter.

The present invention has for a further object the provision of telegraphic apparatus permitting the practical application of the above described system.

The present application is a continuation of the application Serial No. 623,941 filed October 23, 1945, and now abandoned.

According to a preferred form of the invention, the apparatus is accorded a non-rhythmic or start-stop transmission with the aid of a keyboard similar to that of a typewriter, by making a preliminary recording of the required telegraph signals upon a magnetic ribbon and then effecting a synchronised automatic transmission and reception of said signals, the final recording being made upon photographic films with the facility for visual control if required. There is used at the receiving station an electro-optical relay which is, preferably, a cathode-ray oscillograph (with either fluorescent or phosphorescent screen), but which may be any other form of electro-optical relay as, for instance, a tube used for television reception purposes.

Such a telegraphic apparatus combines the advantages of the non-rhythmic manipulation of an ordinary keyboard by a conventional typewriter, and of a high efficiency from the point of view of telegraph traffic; in particular this apparatus permits the complete utilisation of the effective frequency band capable of being transmitted by a telephone channel having a high-frequency carrier current of a modern multiplex telephony system having coaxial cable circuits. Furthermore, such apparatus is instantaneously adaptable to any language, and is particularly suitable for effecting telegraph transmission with secrecy.

Although the final reception is photographic, the possibility of effecting a visual control (either preliminarily or somultaneously) allows, in the particular case where a radio transmission channel affected by troublesome "parasitics" is used, the receiving operator to ask the transmitting operator to repass two or three times, one after the other, the magnetic ribbon upon which the telegram has been recorded, before "erasing" the recording on the ribbon; since the "parasitics" have a fortuitous character, such repetition permits the complete reconstitution of the telegram at the receiving station in spite of the radio parasitics.

In the telegraphic code, used in this invention, to each character (letter, figure or punctuation mark) there is assigned a combination of two signals; a "preliminary signal" and a "code signal," which is itself a single impulse of a predetermined duration, which latter is the same for all characters, each character (letter or figure) being characterized either by the time interval which passes between the end of the preliminary signal and the commencement of said impulse or code signal, or by the amplitude of said impulse or code signal.

The magnetic ribbon upon which the signals are recorded is set in motion and arrested automatically for each character during the manipulation of the keyboard by the typewriter concerned with the recording of the telegrams. The preliminary signal, transmitted regularly, serves to synchronize the scanning of the luminous surface of the electro-optical relay at the receiving station (e. g. the fluorescent or phosphorescent screen of a receiving cathode-ray oscillograph). Further when one desires to receive "by page" and not "by strip," the typewriter at the transmitting station, after each group of 52 characters (letters or figures with the appropriate included spaces), constituting one line of the text to be transmitted, operates several times in succession a key marked "return" in a manner to record on the magnetic ribbon a "return signal" which, at the receiving station serves to bring back the scanning spot from the end of the beginning of its trajectory over the said luminous surface. The preliminary signal and the return signal serve as "synchronising signals" like the "line" and the "frame" synchronising signals respectively, in television; such synchronising signals differ from the "code signals" preferably by their polarity (and in this case, the preliminary signal is itself distinguished from the return signal by its duration): but the synchronisation signals may also be differentiated from the "code signals" by the frequency of a carrier wave (and in that case, the preliminary signal may be differentiated from the return signal either by the duration or by the frequency or by the duration and by the frequency at the same time).

In the case of reception "by strip" a cathode ray oscillograph having a single cathode beam may be used; in the case of reception "by page" however it is preferable to use a cathode ray oscillograph having two cathode beams separated one from the other by a metallic partition forming an electrostatic screen; in this case the first beam corresponds to the "letters" and the second to the "numbers or other signs."

In a first embodiment of the invention, which uses the code wherein each character (letter or figure) is characterized by the time interval which passes between the end of the preliminary signal and the commencement of the corresponding code signal, the luminous screen of the cathode-ray oscillograph consists of a phosphorescent substance, that is to say, one in which, after excitation by the electrons of the cathode beam, the luminous spot persists during a certain time interval which is determined by the nature of this phosphorescent substance; in this case the scanning of the luminous screen by the cathode beam is carried out at a constant speed and the intensity of the beam is modulated by the "code signals."

In a second embodiment of the invention, which utilises the code wherein each character (letter or figure) is characterized by the amplitude of the code signal, the "luminous surface" consists of a fluorescent substance, that is to say, one in which after excitation by the electrons of the cathode beam, the luminous spot disappears immediately; and, in this case the scanning of the luminous screen by the beam is carried out at a variable speed: the intensity of the said cathode beam being kept constant and its displacement along the length of the scanning lines of the luminous screen being controlled by the code signals.

The automatic synchronization between the transmission and reception is assured on the one hand, because on the magnetic ribbon, each recorded character always occupies the same length and because the preliminary signals are all identical and regularly spaced, and, on the other hand, because the exploration of the luminous screen at the receiving station is positively controlled by the received signals. Nevertheless, as the manipulation of the keyboard and the first recording on the magnetic ribbon constitute an operation quite distinct from the transmission of the signals in line, it is not necessary to manipulate the recording keyboard at a regular rate as in other apparatus requiring an exact synchronism between the transmitting and receiving stations.

In the handling of telegraph transmission at a transit or repeating station, a "transit signal" informs the transit office that a series of telegrams is to be transmitted to destinations at one or several other localities; the operator of the transit office then substitutes for his electro-optical relay his magnetic ribbon recorder (with continuous rapid unwinding of the magnetic ribbon); thereafter he retransmits automatically the telegrams thus recorded towards the other localities, while connecting, according to circumstances, his electro-optical relay in shunt to the line to exercise a visual control of the transmission.

The transmitting station according to the invention comprises: a manually operated keyboard, a motor (with arrangements for automatic starting and stopping) the shaft of which may be coupled with a "cam shaft" which carries a plurality of cams and particularly a "transmitting cam" (of signals), a mechanism for unwinding the magnetic ribbon, and a magnetic recorder (constituted by a "premagnetizing" coil and "a recording" coil—the premagnetizing coil serving afterwards as an "erasing" coil in order to permit continuous re-use of the same magnetic ribbon and the recording coil serving also as the reproducing coil during the automatic transmission of recorded telegrams).

The receiving station according to the invention includes, preferably, a cathode-ray oscillograph (with the necessary sources of supply for its electrodes and with the necessary relaxation oscillators for displacing the scanning spot over its fluorescent or phosphorescent screen), a "decoding screen" which is a transparent paper or film upon which the characters (letters, numbers or signs) are traced; an optical system; and a photographic camera for the final reception on photographic film.

All the mechanical energy for the recording as well as that for the transmission or the reception of the signals, is provided by an electric motor with ball bearings fed by the electric power supply mains and provided with an automatic speed regulator (which is, for example, a centrifugal regulator successively short-circuiting and inserting a regulating resistance, arranged in series with the field winding in the case of a continuous current motor with shunt excitation; or in series with the whole of the motor in the case of an alternating current motor with series excitation).

In the drawings:

Fig. 1 shows one embodiment according to the transmitter of the present invention using a helicoidal drum and magnetic recorder;

Figs. 2 and 2a show as a function of time the instantaneous values of current representing different characters;

Fig. 3 is a receiving station for receiving and reproducing the signals transmitted by the transmitter shown in Fig. 1;

Fig. 4 shows the decoding screen and optical system and camera used at the receiving station;

Fig. 5 shows the keyboard used at the transmitting station;

Fig. 6 shows details of the magnetic recorder of Fig. 1;

Fig. 6a shows a magnetization curve for the magnetic circuit of the recorder;

Fig. 7 shows another embodiment of the receiving station using an optical system with a plurality of lenticular elements;

Fig. 8 shows the transmitting cam equipment in another embodiment of transmitting station;

Fig. 9 shows signal pulses produced by the transmitter of Fig. 8;

Fig. 11 shows a detail of the structure of a transmitting cam and its brush;

Fig. 12 shows the control arrangement for the transmitting cams;

Fig. 12a shows the structure of the cam discs;

Fig. 14 shows a receiving arrangement using Kerr cells;

Fig. 15 shows a detail of the optical system of a receiving station using lenticular elements;

Fig. 16 shows a receiving arrangement using a two-grid thyratron fluorescent tube and a synchronized rotating distributor;

Fig. 17 shows a receiving arrangement similar to Fig. 16, but using an artificial line and multivibrator;

Fig. 17a shows the voltage and phase relations in the receiving arrangement of Fig. 17;

Fig. 18 shows another form of receiving arrangement using a toroidal luminescent tube and decoding screen, and an optical system for photographic recording;

Fig. 18a shows schematically the optical system of Fig. 18, in vertical section on the mirror axes;

Fig. 19 shows the signal voltage relations for the receiving arrangement of Fig. 18;

Fig. 22 shows a modification of the receiving arrangement of Fig. 10, using a centrally partitioned cathode-ray tube with provision for automatic return to starting point for page printing;

Fig. 23 shows phase relations between control pulses and signal pulses for the receiving arrangement shown in Fig. 22; and, Fig. 24 shows transmitted wave forms for a transmitting station using three separate keyboards without "letters" or "figures" keys, and providing increased line traffic capacity.

Figure 10:
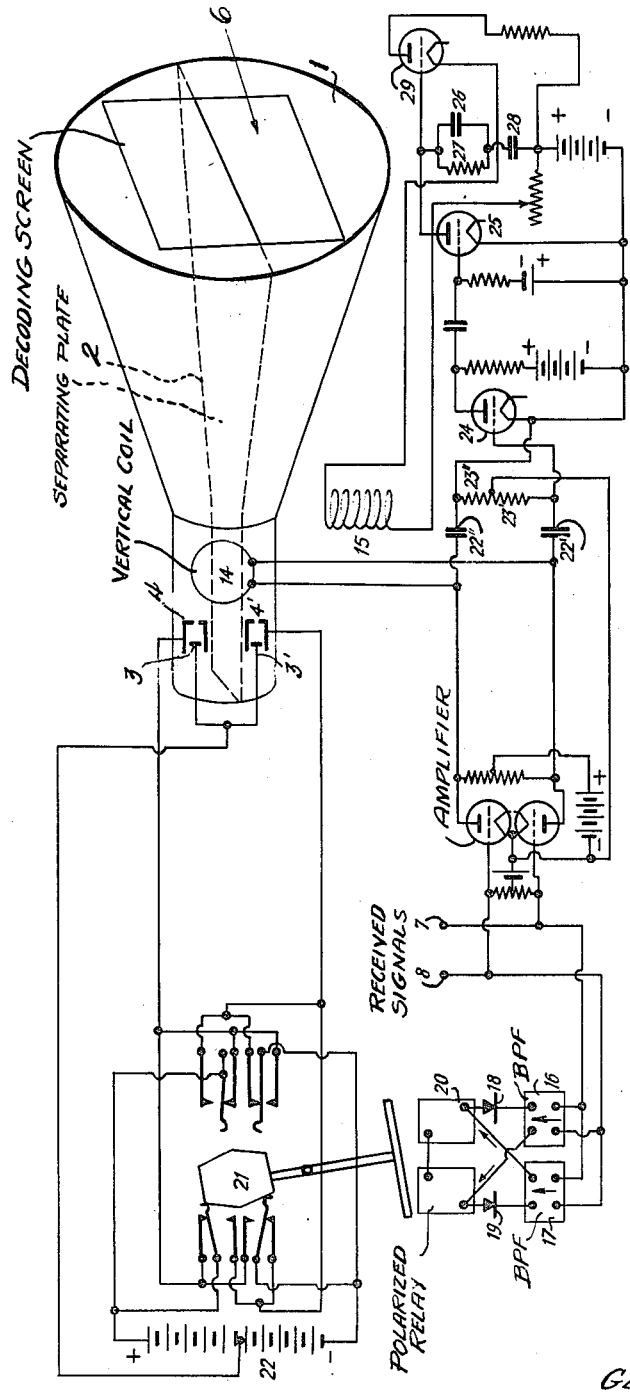
Fig. 10 shows the receiving station for receiving signals sent by the transmitter of Fig. 8.

Figure 1 represents in perspective the sending cam of the first embodiment of the present invention, and Figures 2 and 2a show, as a function of time $t$, the variation of the current in the line when various characters (letters or numbers) are transmitted, the "preliminary signals" $sp$, $sp'$, being assumed to be of negative polarity and the "code signals" $sc$, $sc'$, being short impulses of positive polarity; Figure 3 shows schematically the receiving cathode-ray oscillograph arrangement having two electron beams for reception "by page"; one embodiment of the optical system associated with such cathode-ray oscillograph is shown in section in Figure 4. The assumed form of manually operated keyboard is shown in Figure 5. Figure 6 illustrates the principle of recording on magnetic ribbon.

The operation of any one of the keys of the keyboard causes the displacement of a lever which affects coupling of the cam shaft to the shaft of the electric motor for a single turn of said cam shaft; this may be effected, for example, by means of one of the known automatic coupling arrangements used in start-stop or non-rhythmic telegraph apparatus (e. g. a friction coupling or a pawl, or claw coupling). The displacement of said lever is controlled equally by all the keys, for example, through a frame placed beneath all the keys, articulated about an axle and maintained against a stop by a spring; alternatively it may be controlled through a notched bar placed beneath all the keys. Furthermore, the striking of any key whatever is arranged to move a blocking bar which retains the struck key in lowered position and locks all the other unactuated keys in their rest position during the period of one rotation of the cam shaft. Finally the cam shaft, on terminating its cycle of operation, liberates the struck key which returns to the level of the others and at the same time unlocks the remainder of the keyboard in readiness for the next striking operation; the cam shaft is then disconnected by the device through which it has been driven. The mechanisms used for these operations are well known and are therefore not shown in Figure 1.

In Figure 1 the assembly is represented by P; the emission cam fixed to the cam shaft is represented at 1; it comprises a cylindrical drum carrying projecting strips each of form appropriate to the various electric signals to be transmitted. At the beginning of each revolution of the cam shaft, one of the cams thereon causes the setting in motion of the drum 2 in the direction of the arrow $f'$ to produce a progressive advancement of the magnetic ribbon 3, for example, by means of a ratchet and pawl mechanism; at the same time a projection on the cam shaft effects the closing of an electric contact in the circuit of the electromagnet 4, which then attracts its armature mechanically connected to the arm 5; this arm, being pivoted about the axis $a$—$a$, moves towards the sending cam 1 the rubbing contact (shown by a large black spot) which is carried at the extremity of its upper limb. Subsequently, when the sending cam 1 turns in the direction of the arrow $f$, the raised portion 6 of the cam 1 closes an electric contact 7 and the preliminary signal $sp$ (to the left of Figure 2) is then recorded on the magnetic ribbon 3 by the action of the recording coil B. Thereafter if, for example, the key corresponding to the letter K or to the parenthesis sign has been operated on the keyboard, the corresponding code arm 8 is so moved that, at the moment when the projecting helicoidal strip 10 is so presented with regard to the rubbing contact (shown by a large black spot) that it engages with the extremity of the upper part of the code arm 8, the electric contact 9 closes and the code signal $sc$ corresponding to the letter K or to the parenthesis sign is recorded on the magnetic ribbon 3 by the action of the recording coil B. The tapping of the key marked "V" rigid upon the code arm 8' closes in the same way the electric contact 9' and the code signal corresponding to the letter V or to the signal = is recorded upon the magnetic ribbon.

The helicoidal shape of the strip 10 provides for each character (letter, numeral or sign) the linear interval required between the impressions on the magnetic ribbon of the preliminary signal $sp$ and of the code signal $sc$ corresponding to the character being considered; when the magnetic ribbon is again unwound to pass beneath the coil B (acting this time in the role of a pick-up coil) the preliminary signals $sp$ and code signals $sc$ transmitted in turn will thus have, for each character, the required duration and the required time spacing. When the cam shaft finishes its cycle of movement the magnetic ribbon is arrested after having progressed for a length which is always the same for each character recorded, and the electric contact which has been closing the circuit of the electro-magnet 4 opens so that this electro-magnet releases its armature and the code arm 5 returns to its position of rest.

Disregarding for the moment the keys marked "letters," "numerals" and the bars marked "space" and "return" (Figures 1 and 5) and supposing, for example, that an uninterrupted train of letters is transmitted, and considering that there are 26 separate letters on the keyboard of Figure 5, the width of a code signal $sc$ on the diagram of Figure 2 equals, at the most, one twenty-sixth part of the time interval between the end of the preliminary signal $sp$ and the start of the following preliminary signal $sp'$. If the width of a preliminary signal $sp$ is made five times larger than that of a code signal $sc$, it will be seen that a code signal may be considered as the positive half cycle of a sinusoidal curve S the negative half cycle of which is shown in dotted lines in Figure 2 and has a duration equal to:

$$\frac{2}{5+26}=\frac{2}{31}$$

of the period T of a character (T being shown as lasting from the start of $sp$ to the start of $sp'$, for example).

If there is available a telephone channel of a coaxial circuit having, for example, a carrier frequency of 64,000 cycles per second and transmitting an effective modulation frequency band width of 4000 cycles per second (lower side band modulation), the maximum modulation frequency effectively transmittable may be regarded as 3400 cycles per second; experience in the subject of harmonic analysis of typical wave forms shows that the maximum modulation frequency effectively transmittable must be superior to or at last equal to that of the sinusoidal curve which follows the modulating wave to be transmitted to the most accurate detail, that is to say, in the present case the sinusoidal curve S. It is therefore seen that:

$$3,400=\frac{31}{2T}$$

or $$T=\frac{31}{6,800}$$

second.

T is, in this case, the minimum duration of transmission of one character. It is therefore theoretically possible to obtain for the flow of telegraph traffic a maximum speed of $$\frac{6,800}{31}=219$$

characters per second. In fact as one must transmit, in practice, several supplementary signals ("letters" signal, "numerals" signal, "spacing" signal and above all the "return signal" which must be rather long for reasons indicated later), one may reckon with a commercial speed of 156 characters per second, say 3 lines of 52 characters per second, or around $$\frac{156\times 60}{6}=1560$$

words of letters per minute, with a blank between each pair of consecutive words; this gives a speed which is around five times that of high speed telegraphic systems actually in use. By allotting about 7.3 mm. of the magnetic ribbon to the recording of each character, the unwinding speed of said ribbon at the time of transmission in line is in the order of $219\times 0.0073=1.60$ metres per second.

Figure 3 represents the corresponding receiving station.

1 is the cathode-ray oscillograph separated into two parts by the metal plate 2; by virtue of this metal plate the two cathode beams produced by the electron emitting cathodes 3 or 3' and intensity modulated by the first control grids or Wehnelt cylinders 4 or 4' or advantageously by the second control grids 5 or 5' act, without influence upon one another, on the two halves of the phosphorescent screen which occupies the farther end of the bulb of the oscillograph 1. Opposite to said screen and very close to it is placed a decoding screen 6 which is a paper or a transparent film carrying (in black on white) on its upper half 26 horizontal lines; on the first line the letter A is repeated 52 times; on the second line the letter B and so on, and on the 26th line it is the letter Z which is repeated 52 times. On each one of the horizontal lines of the lower half (of said decoding screen 6) each one of the numerals or signs ( ; ? ( . . . 6) of the keyboard of Figure 5 is similarly repeated 52 times. This decoding screen is therefore a form of chart comprising on each horizontal line 52 repetitions of the same character and on each vertical column 52 different characters, that is to say, each of the characters marked upon the keyboard of Figure 5.

It is very easy to substitute one decoding screen for another (either manually, or mechanically), and this permits the instantaneous adaptation of the apparatus to whichever kind of characters or code is desired, or alternatively to the immediate handling of all telegraph transmission with a "secrecy" assurance by a system in which interchange of letters or characters is made. It suffices (for this second application) that the operator at the transmitting station indicates in the first instance the reference numeral (from a list of decoding screens known in advance) of the particular screen which is to be utilised for reception in clear of the telegram or telegrams which are to be transmitted in secrecy.

The signals ($sp$ and $sc$) received (at the end of a high-frequency carrier current telephonic channel over a coaxial circuit) are, after the demodulator of the terminal equipment of the said telephone channel, applied to the bus-bars 7 and 8. To these bars are connected respectively the cathode 3, 3' and the Wehnelt cylinders 4, 4' of the cathode-ray oscillograph 1; each preliminary signal $sp$ being of negative polarity and being applied during the abrupt fall of the "sawtooth" which is the wave-form of the relaxation oscillator 10 producing the rapid vertical sweeping of the phosphorescent screen, reduces the intensity of the cathode beam to a negligible value, that is to say, removes all visible trace during the return of the scanning spot from the extremity of one vertical half column towards the beginning of the following vertical half column. On the contrary, each code signal *sc* is of positive polarity and is applied after a predetermined interval corresponding to a predetermined point of the slow rising of this "saw-tooth" wave-form, the beam acquiring at such instant a maximum intensity and accordingly exciting the phosphorescence of the screen of the cathode-ray oscillograph at the precise point where there is to be found the letter corresponding to the particular code signal *sc* transmitted.

The exploration time of the half of the decoding screen 6 is equal to 52 times the period $T$ attributed to one character, say about one quarter of a second; if one adopts a substance having a duration of phosphorescent illumination approaching one quarter of a second, too much advantage is given to the letters at the beginning of a line of text in comparison to those at the end of said line. Moreover, a phosphorescence which is so long is superfluous if the brilliance of the luminous screen is made sufficient, that is to say, if use is made of a beam of electrons of sufficient speed.

To constitute the luminous screen swept by the cathode beams a substance possessing a phosphorescent duration of around about $\frac{1}{10}$ of a second only is preferably chosen; in addition the "return signal" is given a duration of $\frac{1}{10}$ of a second also, which corresponds approximately to the transmission of 20 characters.

Each time the operator recording a telegram on the magnetic ribbon has written 52 characters, he then presses 20 times in succession on the bar marked "return" (Figure 5); as will be seen from Figure 1, this brings towards the sending cam the rubbing contact of the cranked arm 11, and as a result the electric contact 12 is closed 20 times in succession. Due to the form of the strip 13 which is a ring of circular shape interrupted over a small arc, this records the return signal *sr* represented in Figure 2a. This signal *sr* is composed of 20 preliminary signals *sp*, *sp'*, *sp''*, etc. of negative polarity between which are interspaced 20 signals, also of negative polarity, but of very much greater duration than those of the preliminary signals. It is this difference of duration which permits the separation at the receiving station of the return signal *sr* from the successive preliminary signals. By referring to Figure 3 one can see that these signals received by the receiving station pass, after demodulation, by way of the bus-bars 7, 8 to the grid circuit of the triode valve 9 whose function is to separate the synchronisation signals (*sp* and *sr*) on the one hand, and the code signals (*sc*), on the other hand. Following a known method in television, the grid of said "separating" valve 9 has a fixed bias so that it is normally cut-off and only the synchronising signals go beyond the bend of the "grid volts" anode current characteristic and in consequence cause the passing of appreciable anode current through the output resistance (amplitude discrimination). The voltage thus produced across the terminals of such resistance by the synchronising signals (*sp* and *sr*) is applied by way of condensers, on the one hand, to the relaxation oscillator 10 which feeds the winding 14 which generates the magnetic field for producing the rapid vertical sweeping of the phosphorescent screen (under the control of the preliminary signals *sp*), and on the other hand, to the grid of a "blocking oscillator" tube 11 (which forms a relaxation oscillator for the control of the horizontal displacement by way of the deflecting plates 15, 15' mounted in parallel). The synchronising signals (*sp* + *sr*) contribute in effect to the charging and discharging of the blocking condenser 12 shunted by the resistance 13, but since the signals *sp* of brief duration produce only very small voltage impulses from the terminals of condenser 12, the longer signals *sr* (charging the condenser during a time period which is very much longer), cause considerable rise of said voltage (with brief momentary decreases at the passing of a signal *sp*); when this voltage attains the value U of the striking voltage of the blocking oscillator 11, this oscillator 11 becomes unblocked and the cathode beam passes rapidly from the end of the last vertical half column to the beginning of the first vertical half column of the decoding screen 6; then, the oscillator 11 becomes reblocked after a single sweep and the same process recommences at the time of the following return signal *sr*. The voltage of the terminals of the blocking condenser 12 also operates (when it attains the value U) an electro-magnet which serves to advance by one line the photographic film in the receiving camera 4 (Figure 4), this advance being made rapidly by means of an appropriate mechanism not shown in Figure 4 (but which is, for example, a Maltese cross mechanism as is used in cinematograph apparatus).

Owing to the long duration of the return signal *sr*, owing to the fact that the receiving photographic film is displaced rapidly only at the end of a return signal (when the voltage U is attained), and furthermore owing to the choice of duration (one tenth of a second) of the phosphorescence time of the luminous screen of the cathode-ray oscillograph; all the letters illuminated have the same brilliance during the same time interval ($\frac{1}{10}$ of a second) and give therefore photographic impressions of the same value on the receiving film.

In Figure 3, it has been assumed that the vertical displacement of the two synchronized cathode beams is controlled by the magnetic field of the horizontal coil 14, while the horizontal displacement (under the control of the return signal *sr*) is controlled by the electric field of a pair of deflection plates (15 or 15'); one may use also a vertical electrostatic deflection or a horizontal magnetic deflection provided the two cathode beams remain always synchronized.

It has previously been assumed, that one has transmitted only letters. Before recording on the magnetic ribbon 3 a group of letters, the typewriter of the transmitting station will operate the "letters" key which has the effect (in the manner of Figure 1) of producing a signal pulse of positive polarity, by the action of the strip 15 on the cranked arm 14 and the contact 19, the frequency of these pulsations being $f_1$; in the same way before recording a group of numbers, the typewriter will operate the "figures" key which has the effect of producing a signal pulse also of positive polarity by the action of the strip 17 on the cranked arm 16 and the contact 20; but the frequency of these pulsations has a value $f_{ch}$ different from $f_1$. If a character corresponds to a duration of transmission $$T = \frac{1}{219}$$

second for example, and if the strip 15 corresponding to the "letters" key (Figure 1) comprises $n_1$ segments and occupies the fraction $p_1$ of the circumference of the emission cam, one has: $f_1 = 219\ p_1 n_1$. In the same way if the strip 17 corresponding to the "numbers" key comprises $n_{ch}$ segments and occupies the fraction $p_{ch}$ of the circumference of the emission cam, one has: $f_{ch} = 219\ p_{ch} n_{ch}$. One chooses the numbers $p_{ch}$, $n_{ch}$, $p_1$, $n_1$, so that the frequencies $f_{ch}$ and $f_1$ are sufficiently different from each other and are both effectively transmissible by the carrier-current telephonic channel over the coaxial cable or other channel employed. For example if $p_{ch} = p_1 = 2/3$, $n_1 = 10$ and $n_{ch} = 15$, one has $f_1 = 1460$ cycles per second and $f_{ch} = 2910$ cycles per second. The "letters" signal $\sigma_1$ (or the "numeral signal" $\sigma_{ch}$) thus generated passes, at the receiving station (Figure 3) from the bus bars 7, 8 to the input of two band-pass filters 16, 17 (having narrow transmission bands with their mean frequencies equal to $f_1$ and $f_{ch}$ respectively); these filters are for example piezoelectric crystal filters. On the one hand, these filters form obstacles to the code signals and to the synchronising signals and on the other hand, they separate one from the other, the letters signal $\sigma_1$ and the numerals signal $\sigma_{ch}$ so that the rectifier cells 18, 19 (of copper oxide type) only pass current to the winding of the polarised relay 20, currents of predetermined sense which place the inversion key 21 in a predetermined position, for example to the left as shown in Figure 3, in the case of the transmission of a group of letters; it can be seen in such figure that, under these conditions the positive terminal of the battery 22 is connected to the second control grid 5 of the cathode beam associated with the upper half of the decoding screen 6 which carries only the letters. The mid point of the battery 22 is connected to the cathode 3. The control grid 5 therefore allows to said cathode beam an intensity which is controlled solely by the Wehnelt cylinder 4. On the contrary, the negative pole of the battery 22 is connected to the second control grid 5' so that the lower half of the decoding screen 6 which carries the numerals and other signs remains obscured while the inversion key 21 rests in the position shown in Figure 3. Inversion of this key is produced when (on the arrival of a "numbers signal" $\sigma_{ch}$) the polarised relay 20 rocks over; this will precede the transmission of a group of numerals, or of punctuation signs to the receiving station.

Figure 4 shows the optical system interposed between the cathode-ray oscillograph 1 (with its metal division plate 2 and its phosphorescent screen 3), on the one hand, and the camera 4 (with its moving photographic film 5) on the other hand. This optical system superposes the image of the 52 lines of characters (letters, numerals or signs) of the decoding screen 6 upon the aperture 7 of the camera 4. In this Figure 4, only 8 lines of characters of the decoding screen 6 (assumed to be perpendicular to the plane of the figure) as shown, namely four lines of letters on the upper half and four lines of numbers or punctuation signs on the lower half.

It is assumed that a high voltage cathode-ray oscillograph (with a voltage of the order of 10,000 volts between the cathode and second anode which is the conductive lining on the internal surface of the conical part of the bulb) will be used so that one has an arrangement in which the electrons possess a high speed at the moment of their impact on the phosphorescent substance occupying the far end of the bulb. The said substance may consist, for example, of tungstate of calcium or of pure zinc sulphide activated thermically and emitting blue radiation favorable for photography; such illumination persisting for about one tenth of a second after the excitation by the cathode beam.

The phosphorescent screen 3 is for example circular and of 28 centimeters in diameter while the decoding screen 6 (placed immediately adjacent to the phosphorescent screen) is a square transparent film of 26 centimeters sides, so that each line of characters is five millimeters high and 26 centimeters long.

The optical system comprises: (1) A reticulated network of 52 cylindrical plano-convex lens elements $l_1, l_2 \ldots l_{52}$ of 5 millimeters height, 260 millimeters length and a focal length $d$ equal to their distance from the decoding screen 6 ($d$ is of the order of 50 centimeters for example); opaque screens $c_1, c_2 \ldots c_{52}$ separate the cylindrical lens elements one from the other. (2) A principal cylindrical lens $L_1$ of square concavo-convex form of 26 centimeters sides. The generatrices of the two faces of said lens $L_1$ are rectangular and the convex face (the generatrices of which are parallel to the plane of Figure 4) has a focal length $d$ equal to that of the lens elements, the latter being cemented to the concave surface of the said principal lens $L_1$. (3) A spherical lens $L_2$ of approximately 34 centimeters diameter having a focal length $d'$ equal to (or less than) $d$ and of which the focus is found on the photographic film 5.

The inherent optical distortions of the arrangement may be compensated for by manufacturing the decoding screen 6 with the aid of the optical system of Figure 4. In this way the optical system itself is used as the photographic objective, with the light rays preceding, in these circumstances in inverse sense. For this one places in front of the aperture 7 a transparent film $P_1$ on which is disposed 52 horizontal lines successively carrying the letters, numbers or other signs without deformation, that is to say: 52 times the letter A on the first line, etc., 52 times the letter Z on the last line of the first half, 52 times the sign : on the first line of the second half, 52 times the numeral 6 on the last line but one, and 52 times the sign on the last line of the second half; said film $P_1$ is then illuminated from behind, and the cathode-ray oscillograph in the arrangement of Figure 4 replaced by a camera in which another photographic film $P_2$ occupies the position of the decoding screen 6; one then un-marks successively the various horizontal lines of the film $P_2$ whilst the film $P_1$ presents successively its various lines in front of the aperture 7; one thus obtains the desired negative of the decoding screen, by virtue of the principle of inverse passage of the luminous rays; on this negative, the letters, numbers and punctuation signs are necessarily subjected to distortions which compensate exactly for those of the optical system of Figure 4, during the subsequent use of said optical system.

To economize with the photographic film, the optical system above described may be modified so as to receive 52 characters in one narrow line on a narrow film, afterwards effecting an enlargement on photographic paper.

To effect the visual control of a telegraphic transmission with the apparatus according to the invention, one can substitute for the camera a translucent screen (of ground glass, for example) which occupies, exactly, the position of the photographic film 5 in Figure 4; but, as with the high speed of telegraphic transmission previously quoted, each of the 52 characters of any one line of text transmitted are projected on said translucent screen during $\frac{1}{10}$ of a second only, it is not possible to verify each character transmitted; what is important however is to verify (before the transmission of a series of telegrams) that the deflections of the cathode beams are properly synchronized and properly framed, and this visual control may be effected conveniently, for example, in the following manner.

Before recording a series of telegrams to be transmitted, the operator at the transmitting station strikes a certain number of times in succession the bar marked "spacing" on the keyboard of Figure 5, striking also the bar marked "return" (20 times in succession) after each series of 52 taps of the "spacing" bar. It can be seen from Figure 1 that the cranked arm 18 corresponding to the bar marked "spacing" does not carry a rubbing contact and also does not close any electric contact when the emission cam 1 rotates, because such cam does not carry any projecting strip with relation to such "spacing" bar. The tapping of the "spacing" bar a number of times in succession, with the tapping of the "return" bar at regular intervals is made only for the purpose of recording on the magnetic ribbon a series of regularly spaced preliminary signals $sp, sp', sp''$, with the return signals $sr$ interspaced, but without any code signals (see Figures 2 and 2a). The subsequent automatic transmission of such initial recording is therefore simply for the purpose of giving the "timing" of synchronisation to the receiving station. By raising a safety shutter on the exterior casing of the optical system (a shutter located between the decoding screen 6 and the optical system $l_1 \ldots l_{52}+L_1$ (Figure 4)) the operator at the receiving station is able to view the scanning "raster" on the phosphorescent screen 3, through the decoding screen 6; he may thus operate the regulating controls of the cathode-ray oscillograph so as properly to "frame" the scanning.

One may associate, with the manual keyboard of Figure 1, a mechanical arrangement for effecting automatically said series of successive operations of the "spacing" and "return" bars; one such arrangement is constituted essentially by a mechanism for automatically putting into action a ratchet wheel and pawl device which stops itself automatically when a predetermined number of ratchet teeth have passed under the pawl, said wheel moving, on the other hand, a tapping lever. The visual control described above may equally well be used from time to time in course of transmission by the operator of a terminal receiving station, or by the operator of a transit or repeater station, in order to check the operation and particularly, in the case of a radio transmission channel, to see if parasitic "disturbances" are troubling such transmission, such disturbance being indicated by alteration of the "framing" of the scanning raster.

The principle of recording on the magnetic ribbon (associated with the manual keyboard of the transmitting station) is illustrated in Figure 6; to the left of this figure is shown the magnetic ribbon 3 of Figure 1 carried by the pulley 2 (associated with a ratchet wheel). The recording magnet structure B transversely magnetizes the magnetic ribbon 3, the pole pieces (out to tapered points) being placed opposite each other and on opposite sides of the magnetic ribbon; it carries a "polarizing" coil 8 having terminals 4, 4' and a separate "recording" coil having terminals 1, 1'. In addition the arrangement has a further "premagnetizing" magnet B', the purpose of which is explained by the magnetization diagram, to the right of Figure 6; the pole pieces also cut in tapered form of such magnet B' are on one side and the other of the magnetic ribbon and it has only one winding having terminals 5, 5'.

Before passing between the pole pieces of the recording magnet B the magnetic ribbon passes between the pole pieces of the premagnetizing magnet B' which are strongly magnetized; the characteristic point (on the magnetization diagram shown in Fig. 6a) thereupon passes from the position O to the position S corresponding to magnetic saturation. When the ribbon passes again from between the pole pieces B', its magnetization decreases and the characteristic point moves to R (residual magnetism). The polarizing winding (4, 4') of the recording magnet B has for its purpose, if it operates alone, of moving the characteristic point to F (point of operation) which is to be found in the vicinity of the first third part of the rectilinear portion MN. If a preliminary signal $sp$ (of relative amplitude 30% and of negative polarity) traverses the recording winding (1, 1') the characteristic point goes to M; if a code signal ($sc$) of relative amplitude 70% and of positive polarity traverses the recording winding 1, 1' the characteristic point goes to N. In the two cases, this point is displaced over the rectilinear portion MN, so that the recording function is a linear one, that is to say, the magnetization of the magnetic ribbon is proportional to the amplitude of the signals which traverse the recording winding.

When the magnetic ribbon has passed beyond the pole pieces of the recording magnet, the flux variation range becomes M'N' instead of MN.

For the purpose of automatic transmission at the telegraphic sending station (or for the automatic retransmission in a transit station) of the telegrams thus recorded, one reverses the order of these operations; the recording coil is disconnected from the battery D (Figure 1) and is connected to the line (or to the transmitting antenna) through the intermediary of the output carrier-current terminal equipment; the magnetic ribbon passes first between the pole pieces of the magnet B, which then play the role of a reproducing magnet, and the electric signals induced in the winding 1, 1' are transmitted to the distant receiving station. Thereafter the magnetic ribbon passes between the pole pieces of the magnet B' which "erases" the recording, and so renders the ribbon ready for re-service for other telegrams.

Figure 7 shows the receiving station of another embodiment of the invention. It provides a telegraphic apparatus capable of slower speed than that described above but which is capable of giving at will a reception in strip form or reception in page form. The cathode-ray oscillograph 1 has only one electron beam emitted by the cathode 3 and the intensity of which is modulated by the Wehnelt cylinder 4 under the influence of the code signals ($sc$), coming from the transmitting station (Figure 2a). The end of such pencil or beam of rays is displaced over the phosphorescent screen (occupying the further end of the bulb 1), either following a circle of large radius $C_1$ or following a circle of slightly less radius $C_{ch}$. On the decoding screen 6 are drawn (in black on a transparent background) the 26 letters of the keyboard of Figure 5 around the circle $C_1$ and the 26 numerals (or signs) of the keyboard around the circle $C_{ch}$, these characters are so oriented that their images, in traversing the optical system $L_1$, $L_2$ become superimposed on the photographic film 5, each one being in the normal position on a printed text (one may make the decoding screen photographically as already described, by using the optical system $L_1$, $L_2$ as objective and by placing at 5 successively each character serving as a luminous object; one may thus compensate for the residual aberrations of the optical system in its subsequent use).

Two rings of 26 small spherical lenses $l_1 \ldots l_{26}$ and $l'_1 \ldots l'_{26}$, having for their foci the various characters of the screen 6, are secured (around the length of two concentric circles) against one face of the spherical lens $L_1$; $L_2$ is likewise a spherical lens the focus of which is on the photographic receiving film 5.

The radial electrostatic deviation of the cathode beam of the oscillograph 1 is effected by the coaxial truncated conical electrodes 15, 15'; the magnetic circular displacement of said beam is effected by two pairs of magnet windings 14, 14', arranged at right angles to each other and traversed by currents phase displaced one with respect to the other, so as to provide a rotating magnetic field.

According as the "letters" signal or the "numerals" signal has been received, and filtered by the band pass filters (of narrow pass-band) 16 and 17, the polarised relay 20 has brought its armature 21 in contact with the left hand abutment (in the case of letters) or the right hand abutment (in the case of numbers or other signs), and the electric field between the two truncated conical electrodes 15, 15' has taken a (constant) value such that the radial deflection of the extremity of the cathode beam on the phosphorescent screen is just equal to the radius of the circle $C_1$ (or to the radius of the circle $C_{ch}$) the battery 22 serving as the voltage source for producing such radial deviation. 18 and 19 are again two copperoxide rectifiers, as in Figure 3. The separating valve 9 (by amplitude discrimination) separates the preliminary signals $sp$, $sp' \ldots$ (Figure 2a) from among all the signals received over the bus-bars 7, 8. It applies these preliminary signals to the control grids of two mercury-vapor tubes 10, 10' arranged as a "static electric convertor," controlled synchronously by the preliminary signals $sp$, $sp'$ coming from the transmitting station. These two tubes 10, 10' are (as shown in Figure 7) inserted in an oscillatory circuit (arranged in balance or "push-pull" manner) fundamental frequency of which is determined by the anode transformer 12 and by the anode condenser 13; the transformer 11 provides a coupling between grids and anodes, that is to say, a feed-back which is just sufficient for the arrangement to set up oscillations in the absence of any application of the preliminary signals ($sp$), when one closes the switch 23 and supplies a source of direct current to the terminals 24, 24'. The condenser 13 and the grid condenser 25 are adjusted to realise near agreement with the desired frequency (according to the speed of telegraphc transmission suited to the transmitting station). When the preliminary signals $sp$ are received and applied to the grids of the tubes 10, 10', the arrangement synchronizes itself in rigidly locked manner with the frequency of the said preliminary signals.

The mercury vapor tubes 10, 10' have indirectly heated cathodes, and their grids are biased by the intermediary of a resistance placed in shunt across the heater circuit of the cathodes. The supply to the anodes is made by way of the choke coil 26 which serves to limit the voltage and which also assists the oscillatory circuit to pass from one current alternation to the other. If one properly adjusts the tuning condensers 13 and 25 as well as the bias voltage of the grids, one obtains as the output of the transformer 12 a wave of sinusoidal form; the grids of tube 10, 10' only operate, in effect, as "unlatchers" when the preliminary signals (synchronizing impulses $sp$) attain the value necessary for this unlatching and it is the oscillatory circuit 12, 13 which determines the form of the wave produced by this static convertor. In the case of a radio transmission channel, to avoid untimely unlatching or a defective unlatching due to radio parasitics, and therefore to avoid irregular or abrupt stopping of the oscillation of the convertor, it may be desirable to insert a triode vacuum tube oscillator between the output of the separator tube 9 and the grids of the mercury vapor tubes 10 and 10' of the convertor.

The sinusoidal synchronized wave obtained by means of the static convertor 10, 10' is applied directly to the coil 14' by way of a regulating potentiometer; one derives also, by the aid of condenser 27, another sinusoidal wave of the same frequency but phase displaced by 90°, which is applied to the coil 14. The magnetic fields produced by the coils 14, 14' combine to create a rotating field which produces the circular deflection of the electron beam of the cathode-ray oscillograph 1.

The preliminary signals (separated by the tube 9) bring about, on the other hand, the unwinding of the strip of photographic film 5 (for example by way of a synchronous motor of the Lacour phonic wheel type associated with a mechanism for intermittent rotation without shock comprising a member in the form of a Maltese cross; such motor and such mechanism are not shown in Figure 7). If it is desired to receive by page, it is necessary that the typewriter of the transmitting station should take the precaution of tapping several times in succession the "spacing" key of his keyboard after the tapping of each line of text of normal length, that is to say, for example, after the tapping of 52 characters; it suffices then to utilize, at the receiving station, a supplementary mechanism, controlled by the said phonic wheel, and serving to return automatically (in the interior of the camera) the film carrying carriage 5 in a manner which takes it past the focus of the lens $L_2$ from the extremity of one horizontal line of the film 5 to the beginning of the following line. In order that all the characters are marked on the photographic film 5 with the same intensity, it is necessary to give to the preliminary signal $sp$ (Figure 2a) a duration equal to one third of that of the period T corresponding to one character, to employ a phosphorescent substance having a phosphorescence duration also equal to $T/3$, and finally to orient the member in the form of a Maltese cross in the mechanism previously referred to in such manner that the rapid displacement of the strip of photographic film (to pass from a first character to a second character immediately following) is produced at the end of the preliminary signal which precedes such second character; in consequence of this requirement the maximum possible speed of telegraphic transmission in this case is smaller than that obtainable with the first embodiment of the invention shown in Figures 1 and 3.

Figure 8 shows the sending cam in the case of the second embodiment of the invention; Figure 9 shows the preliminary signals $sp$, $sp'$ . . . and the code signals $sc$, $sc'$ etc . . . generated by such cam; Figure 10 shows the corresponding receiving station, the optical system used between the decoding screen 6 and the receiving photographic film is for example that shown in Figure 4. In this case, all the code signals differ one from the other by their amplitude. For this purpose, the emission cam (Figure 8) carries a projecting portion 10 in the form of a collar, that is to say a cylinder interrupted over a small portion of its surface, and the contacts 9, 9' etc . . . controlled by the various character keys V, K etc. . . . are connected to different tappings of a resistance R arranged in series with the battery P. In this case the emission cam does not carry any strip related to the return signal (see later) but the other elements of Figure 8 are the same as the corresponding elements of Figure 1.

The signals thus generated (Figure 9) are received over the bus-bars 7, 8, of the receiving station (Figure 10) which shows a cathode-ray oscillograph 1, with two cathode electron beams (separated one from the other by the metal plate 2), the cathodes being 3, 3' and the Wehnelt cylinders controlling the intensity of the beams being 4, 4'; in this case there are no second control grids and the luminous screen (behind which is placed the transparent decoding screen 6) is constituted by a fluorescent substance having as small a luminous persistence as possible after its excitation by the electrons of the cathode beam. The cathode beam (upper or lower) must accordingly be displaced rapidly to obtain the position of the character to be traced on the receiving photographic film, rest in such position during the greater part of the period T attributed to each character, and afterwards return rapidly to the point of departure.

This result is attained by applying the code signals (Figure 9) to the coil 14 producing the vertical magnetic deflection of the cathode beams (Figure 10). By giving a sufficiently great slope to the inclined parts of the begining and the end of each code signal $sc$, it is possible to obtain a very great speed of the scanning spot before and after a prolonged resting at the desired position. The luminous impression produced being proportional to the power E which produces the cathode beam when at rest and to the size $e$ of the scanning spot and inversely proportional to the speed $v$ of said spot, it follows that the paths by which the scanning spot proceeds to and returns from the desired position will be invisible whereas the point where the desired character is to be found and on which the scanning spot is arrested during a certain period equal to almost all the duration T will become very luminous. The range of modulating frequencies of transmission necessary with this second embodiment of the invention is of the same order as that of the first embodiment due to the necessity of reproducing the initial and final steeply sloping parts of the code signals (Figure 9) and the need of having the sharpest possible corners at each extremity of the horizontal tops of such signals. In Figure 10 there is again the inversion key 21 fixed to the armature of the polarized electro-magnet 20 which permits the illumination of the letters on the upper half of the decoding screen 6 or the numbers or other signs on the lower half of said decoding screen following upon the preliminary reception of the "letters" signal or the "numbers" signal respectively; in this case one simply changes the polarity of the Wehnelt cylinder 4 or 4' with respect to the corresponding cathode 3 or 3', in a manner to "brighten" or "black-out" the corresponding exploring spot on the fluorescent screen, each cathode beam maintaining a constant intensity (either zero, or maximum according to said polarity of the Wehnelt cylinder), during the whole of the transmission of a group of characters of the same nature.

The horizontal magnetic deflection of the cathode beam is effected by means of the coil 15 in the following manner. The tapping of the "return" bar (Figure 8) is simply for effecting the short-circuiting during a certain time $to$ of the electro-magnet 4 relating to the preliminary signal, in a manner to suppress all signals during such time $to$, that is to say, both preliminary signals $sp$ and code signals $sc$ (Figure 9) are suppressed.

In the course of the transmission of a line of text of a telegram, for instance, of a group of 52 characters, the signals received over the bus-bars 7, 8 (Figure 10) after passing through a balanced amplifier arrangement (or a push-pull arrangement, favorable for reducing distortion due to non-linearity) supply the coil 14, as previously described; a part thereof is also applied to the arrangement of condensers 22', 22'' and the resistance 23, 23'' which form a differentiating circuit (in the mathematical sense of the word) producing an impulse during each preliminary signal ($sp$, $sp'$, etc. . . .). These impulses are amplified by the triode valve 24 which is so arranged that its output consists of amplified impulses rendering always positive the grid of the following valve 25. This latter grid is normally biased below the lower bend of its characteristic. In the output circuit of such valve 25 is a circuit of predetermined time-constant constituted by the resistance 27 in parallel with the condenser 26, this arrangement itself being in series with another condenser 28. This condenser 28 accordingly receives, at the moment of each preliminary signal $sp$, an additional charge, so that the voltage between its electrodes is gradually increased by successive jumps; it is just this voltage which supplies (by way of a regulating resistance) the coil 15 which produces the horizontal deflection of the cathode beams. The circuit arrangement formed by the resistance 27 and the condenser 26 mounted in parallel controls, on the other hand, the polarization of the grid of a gas filled electric discharge tube or thyratron 29. The time constant of the circuit formed by such parallel connected resistance 27 and condenser 26 is so chosen that, by reason of its length, there is no interruption during the transmission of the preliminary signals $sp$, $sp'$, and as a result the potential of the thyratron grid remains below the ignition point of the electric discharge through the gas. When the group of 52 characters has been transmitted, however, the preliminary signals $sp$ cease during a certain time $to$, and at this moment due to the value given to the time constant of the circuit 26, 27 the negative control grid bias voltage of the thyratron is reduced sufficiently to cause a discharge whereupon the condenser 28 discharges itself rapidly. The thyratron 29 thus plays the role of a rapid interrupter switch which closes at an accurately defined instant due to appropriate choice of the time constant of the circuit 26, 27, and this closing continues during a spfficiently short time *to* equal to the duration of the suppression of the preliminary signals.

Various modifications may be employed in the various embodiments (described above) of the invention without departing from the scope thereof. Instead of using a cathode-ray oscillograph as "electro-optical relay" at the telegraphic receiving station, one may utilise another type of television apparatus employing, instead of the fluorescent excitation by the impact of electrons, as a source of modulated light, gas or vapor filled luminescent discharge tubes, or else either Kerr cells (of double electric refraction) or of a magnetic double-refraction arrangement, interposed in the path of luminous rays between a polarizer and crossed analyzer, or Nicol prisms.

In particular, in the first embodiment of the invention, one may utilise at the receiving station a powerful light source illuminating successively different points of a phosphorescent screen (against which is placed the decoding screen) by way of a scanning Nipkow disc (or a mirror wheel) and by way of a Kerr cell which intensity modulates the said illumination and is placed between a polarizer and a crossed analyzer.

Figure 13:
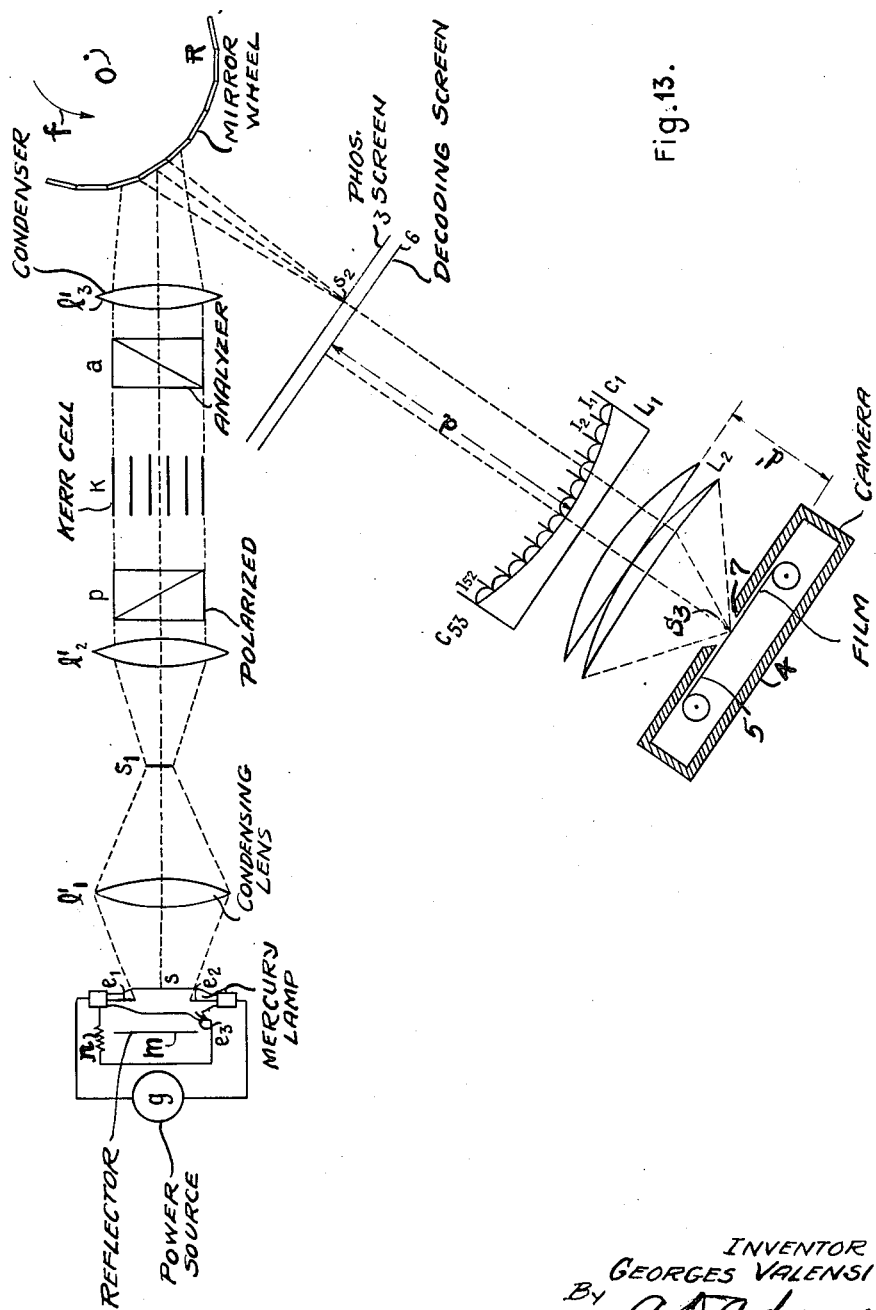
Fig. 13 shows a receiving optical system employing a Kerr cell.

On the other hand, instead of employing as a sending cam (Figures 1 or 8) a cylinder with projecting strips (of which the manufacture by milling may not be economical when it is a question of making a large number of identical pieces of apparatus) one may utilise a group of cams resembling the arrangement commonly utilised in automatic telephone installations under the name of "combiner" or "sequential commutator" (sequence switch). Figures 11, 12 and 13 illustrate one embodiment of the manufacture and mounting (as well as the automatic starting and stopping) of a sending cam constructed in this manner.

Figure 11 shows in section one of the cam elements forming the emission cam; it is constituted by a disc of insulating material $i$ (of bakelized board for example) on the faces of which are applied two metal plates (of phosphor bronze for example); the plate $f'$ on the left is a plain ring, while the plate $f$ on the right is a ring notched or cut-out in a manner corresponding to the electric signal which one wishes to emit.

The three rings represented in Figure 12a are examples of such cut-outs utilised in the case of the first embodiment of the invention, the plate $f$ being on each drawing the annular part which is not hatched. Rivets $r$, $r'$ serve to assemble the discs $f$, $f'$ and to connect them electrically one with the other; two spring blades 134, 135 (of a softer metal than that of the plates) and isolated electrically one from the other in their common support 133, press on the two plates $f$ and $f'$ at a region near to the external circumference of the rings. The electric contact between these springs is therefore broken each time the end of the spring pressing on the plate $f$ passes over a cut-out of said plate, that is to say, over a part of the central insulating disc $i$. The latter is pierced at its center by a square hole, with a small keyway forming a reference mark on one of the sides of the square.

The various cam elements of such kind (as shown in Figure 12) are assembled on a shaft A of square section, all the reference marked sides of the square holes of the cam elements being placed on the same face of the shaft A, and with all the plates $f'$ facing to the left and all the plates $f$ facing to the right. Finally all the spring blades are aligned. Sleeves or collars, not shown, suitably separate the various cam elements one from the other. The cross section of the shaft A being as nearly identical as possible with the square holes of the various cams (i. e. with the least possible amount of play), the differences in the angular spacing between the cutouts or gaps in the various plates $f$ maintain their predetermined values relative to one another. This adjustment is furthermore facilitated by alignment holes, represented by the small circles on the plates drawn in Figure 12a, and through which are passed thin rigid rods before finally tightening the lateral clamping means (not shown) which secure the cam elements in place upon the shaft A.

The said differences in the angular spacing of the various cut-outs or gaps having predetermined and accurate values, provide a control of the instants of contact between opposite spring blades of each of the pairs of blades corresponding to the various cam elements whereby signals of predetermined wave-form and with predetermined phase displacement are obtained when the shaft A of the "emission cam" turns. It is necessary that such shaft starts to turn automatically when any key of the manual keyboard is operated and subsequently stops itself automatically after having made a single complete turn. During this time, the mechanism which bolts the non-operated keys of the keyboard when one key is struck by the operator must also maintain separated the plates and the cooperating flexible blades corresponding to each of the unoperated keys so that only the desired signal is each time recorded on the magnetic ribbon.

Figure 12 shows the automatic starting of the shaft A when the operator closes the contact $t$ on striking one key of his keyboard and the automatic stopping of such shaft A after one complete turn is effected. This figure corresponds to the first embodiment of the invention and the reference numerals used in respect of the contacts of the spring blades correspond to those of Figure 1. When the contact $t$ is closed, the circuit of the battery $p$ through the electro-magnet $R_1$ is completed and this electro-magnet, in attracting its armature, closes the further contact $c$. When the shaft A is at rest, all the tips of the spring blades are aligned in a common reference plane represented by the vertical dotted line passing through the centre of the shaft A in Figure 12. In consequence, the electric contact $a$ through the points 134, 135 of the security cam CS is closed when the shaft A is at rest and the circuit of the electro-magnet $R_2$ is closed when the said contact $c$ is closed. This electromagnet $R_2$ thereupon attracts its armature which ceases to bend (by the pressure of lug $b$ thereon under the action of spring $r$) the flexible toothed pinion $Q'$, which then enters into engagement with the toothed pinion $Q$ fixed on the shaft of electric motor M which rotates continuously at an uniform speed controlled by the centrifugal governor $Rg$.

At the beginning of the rotation of the shaft A the contact 7, corresponding to the cam Csp (Figure 12a), closes and the preliminary signals $sp$ (Figure 2) is recorded. Then, the particular cam Csc through its contact 9 and points 131, 132, which corresponds to the key which has been operated and which alone of said spring blades is engaged with the corresponding plates, sends at the desired moment the code signals $sc$ corresponding to the required character. A little before the end of the signal turn of the shaft A, the insulated part of the security cam CS enters between the corresponding spring blades and the circuit between such blades is opened. The electro-magnet $R_2$ then releases its armature and the lug $b$ re-engages the toothed pinion Q' so as to disengage it from the motor pinion Q and the shaft A ceases to turn. The circular arc $x$ (Fig. 12a) on the security cam CS corresponds to the duration of the releasing operation of the electro-magnet $R_2$ and of the action of disengaging the toothed pinions P and P'. The cam $Csl$ and $Csch$, for emitting the "letters signal" and the "numbers signal" and associated with electric contacts 19 and 20 respectively, have cut-out plates of cog-like form of which the teeth correspond to the raised segments of the rings 15 and 17, of Figure 1 respectively. The cam $Csr$, sending the "return signal" and associated with the contacts 12, has a plate carrying only one very large recess which corresponds to the cut-out of the ring 13 of Figure 1.

In the case of the second embodiment of the invention, all the cams $Csc$, corresponding to the various characters (letters, numerals and punctuation signs) will have identical plates carrying only one cut-out region of a size corresponding to the gap in collar 18 of Figure 8.

It has already been indicated previously that instead of using a cathode-ray oscillograph as electrooptical relay at the telegraph receiving station, one may use another type of television apparatus employing, as source of modulated light, instead of the fluorescence excited by the impact of electrons, luminescent electric gas or vapor discharge lamps or Kerr cells (of electric double-refraction) or of arrangements of magnetic double-refraction interposed in the path of luminous rays between a polarizer and a crossed analyzer or the like. In particular, in the first embodiment of the invention, one may utilize, at the receiving station, a powerful source illuminating successively various points of a phosphorescent screen (against which is placed the decoding screen) through a scanning Nipkow disc (or with a mirror wheel) and by way of a Kerr cell which modulates the intensity of said lumination and is placed between a polarizer and a crossed prism analyzer.

Hereafter will be described various embodiments of the receiving station according to the first or the second embodiments of the invention, using respectively as electro-optical relay:

(A) A Kerr cell associated with a mirror wheel (Figures 13, 13a, 13b, 14, 14a, and 14b).

Figure 20A:
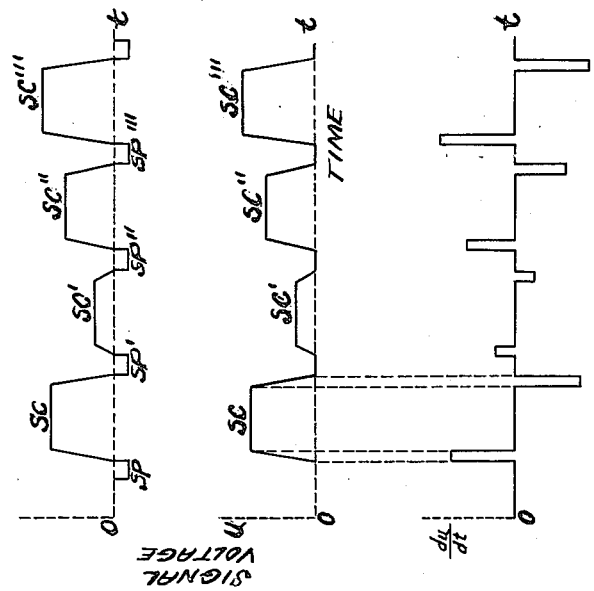
Fig. 20a shows received signal voltage wave forms for the arrangement of Fig. 20.
Figure 20:
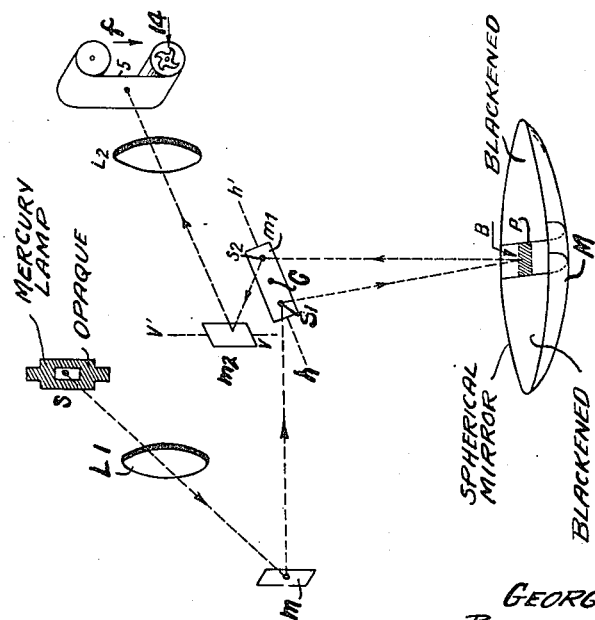
Fig. 20 shows the optical and photographic system of another receiving arrangement using a spherical mirror having a coded reflecting strip.
Figure 21:
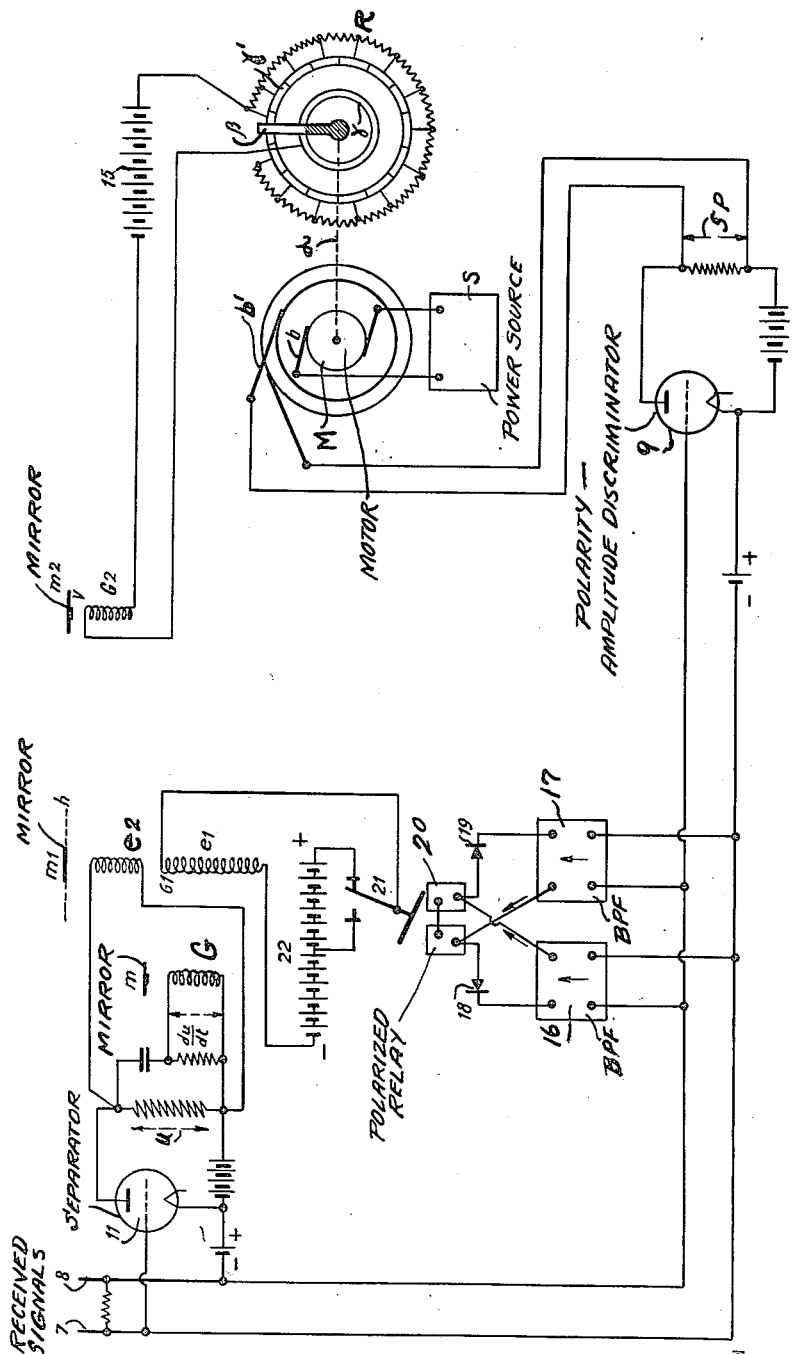
Fig. 21 shows the galvanometer and synchronizing control circuit for the receiving arrangement of Fig. 20.

(B) A group of gas or vapor filled electric discharge lamps (Figures 15, 15a, 15b, 16, 16a, 17 and 17a), (C) A luminescent tube associated with electro-mechanical relays (Figures 18 and 19), (D) A group of three electro mechanical relays (Figures 20, 20a and 21).

(A) Figure 13 represents schematically the optical arrangements and Figure 14 the electrical arrangement of a telegraphic receiving station according to the first embodiment of the invention utilizing as electro-optical relays Kerr cells K, associated with mirror wheels R (of which one only is shown in part in Figure 13); 3 represents a screen coated with phosphorescent substance emitting blue and violet radiation (for example of pure zinc-sulphide activated by a thermal treatment or of zinc-sulphide activated with silver); 6 represents the decoding screen carrying the various characters (letters, numbers or other signs); $L_1$, $L_2$ is the optical system which superposes the images of said characters on a line of photographic film 5 in the camera 4 through the aperture 7. $g$ is an electric current generator feeding a high pressure mercury vapor lamp $s$ (preferably consisting of quartz); such lamp $s$ (which serves as light source) comprises two principle electrodes $e_1$, $e_2$ and a striking electrode $e_3$ which permits operation at low voltage and is in series with a resistance $r$ which limits the intensity of the priming discharge. Behnd the lamp is located a reflector $m$ (of aluminum or of nickel) which reflects all the light in the required useful direction. The electric discharge in the high pressure mercury vapor produces, in particular, blue and violet radiations, as well as a group of radiations in the near ultra-violet region; these latter radiations powerfully excite the phosphorescence of various substances and, in particular, of zinc-sulphide activated by a thermal process, which then emits a phosphorescent blue light acting efficiently on photographic emulsions.

The supports for the phosphorescent screen 3 and the decoding screen 6 are made of a substance transparent to the near ultra-violet, violet and blue radiations (for example, of quartz or of a substantially pure silica, called "uviol glass") while the mirrors of the wheels R, R' are of a material having a large reflecting power for such radiations (aluminum or nickel, for example); the remainder of the optical system interposed in Figure 13 between the source $s$ and the photographic film 5 is likewise transparent to the blue, violet and near ultra-violet radiations; consequently the direct rays (which have not excited phosphorescence) add their action to the light of phosphorescence for marking the image of the desired character upon the photographic film 5.

In lieu of a mercury vapor lamp, one may utilize (as source $s$) any other source rich in violet and ultra-violet radiations, for example, a lamp containing a mixture of neon, helium and nitrogen (with a pressure of the mixed gases of the order of 8 mm. of mercury and a proportion of nitrogen of the order of 10%); such a lamp (fed by a current of 60 milliamperes at 400 to 500 volts) can effect marking of a sensitive photographic film which it illuminates directly for an exposure time of $\frac{1}{12,000}$ second only.

The condensing lens $l'_1$ forms an image $s_1$ of the source $s$ at the focus of the lens $l'_2$, and this produces a beam of parallel rays transversing the polarizer $p$ and passing between the electrodes of the Kerr cell K, which is, for example, a cell with multiple electrodes of polished nickel immersed in pure nitro-benzene. After the analyzer $a$, said beam is condensed by the lens $l'_3$ in an image $s_2$ of the source $s$ and the mirror wheel R (in turning about its axis O in the direction of the arrow $f$) displaces such image $s_2$ over one half of the phosphorescent screen 3 along parallel scanning lines, and the Kerr cell K modulates the intensity of such image $s_2$ according to the voltage applied between its electrodes: this voltage varies as a function of time proportionately to the code signals $sc$, $sc'$, $sc''$ ... (Figure 13a), so that only the desired character is illuminated on each scanning line of the decoding screen 6, firstly during the time period of the corresponding code signal, by the ultra-violet light which filters between the screens 3 and 6 and also by the fluorescent light of the screen 3, and secondly, during the time period of phosphorescence of the screen 3 by the blue light of phosphorescence thereof.

This phosphorescence time period (which is of the order of $\frac{1}{10}$ of a second, for example) is either determined by the substance itself coating the screen 3, or is strictly regulated by the employment (in addition to the light beam modulated by the Kerr cell K) of an auxiliary unmodulated beam of light of much longer wave-length (red light or infra-red light) which effaces the phosphorescence in the manner described in French Patent No. 774,971, and in the patent of addition thereto No. 45,784. The means for producing and deflecting such auxiliary beam of non-modulated longer wave-length light are not shown in Figure 13. Furthermore while in Figure 13 there is represented only one beam of modulated light (by the Kerr cell K) the trace $s_2$ of which scans half of the phosphorescent screen 3 (corresponding for example to the half of the decoding screen 6) which carries the letters the telegraphic receiving station uses in addition, a second beam of modulated light (by the Kerr cell K') the trace $s'_2$ of which scans the other half of the phosphorescent screen 3 (which corresponds to the half of the decoding screen 6 carrying the numerals and punctuation signs) due to the action of a second mirror wheel R' not shown.

As there are 52 characters in each line of the decoding screen each mirror wheel (R or R') comprises 52 mirrors each tangential to the centre O and inclined by different amounts about the axis O of the wheel from one extreme angle $+\theta$ to another extreme angle $-\theta'$ with respect to the mirror parallel to the axis O (and serving as a basis of reference on each mirror wheel). The relative positions of the two mirror wheels R, R' (driven by the same electric motor) are such that the traces $s_2$ and $s'_2$ of the two beams of modulated light reflected therefrom explore correspondingly at the same time the two halves of the screen 3.

The Kerr cells K, K' shown in Figure 14, operate according to the known principle described hereinafter.

Figure 14A:
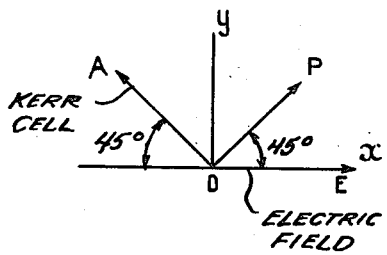
Fig. 14a shows orientations of optical axes and directions of electric fields in the arrangement of Fig. 14.

A substance endowed with the property of electric double refraction (nitro-benzene, carbon sulphide, quartz "herapathite," propionate or chloride of cholesterin, etc.) constitutes the dielectric of each one of said cells which are placed between a polarizer and a crossed prism analyzer, the directions of vibration, P and A, of which are arranged at 45 degrees to the electric field E produced between the electrodes of said cell (Figure 14a). If $I_o$ denotes the intensity of the light beam which emerges from the polarizer, the luminous intensity I which emerges from the analyzer is equal to zero in the absence of all electric field, that is to say, when the difference of potential V between the electrodes of the Kerr cell is nil.

On the contrary, when one applies a difference of potential V other than zero between said electrodes, the intensity I of the emerging light beam is:

$$I = I_o \operatorname{Sin}^2 \frac{BLV^2}{S^2}$$

where L is the length of the luminous path through the dielectric of the cell, S is the spacing between the electrodes of the cell and B is the Kerr-constant characterising the substance used as dielectric medium.

Figure 14B:
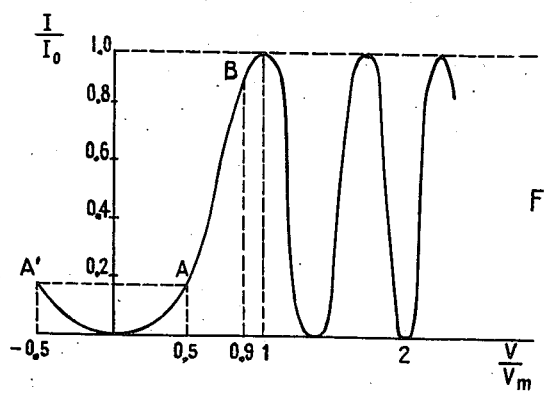
Fig. 14b shows the current ratios for different voltage ratios of the Kerr cells in the arrangement of Fig. 14.

If $V_m$ designates the voltage for which the dielectric layer plays the role of a half-wave plate, the variations of the ratio $I/I_o$ as the voltage applied between the electrodes of the cell is increased are shown graphically by the curve of Figure 14b.

Figure 13A:
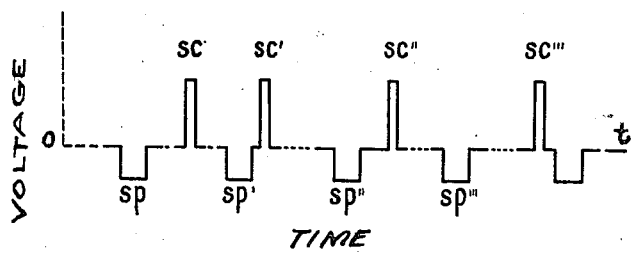
Fig. 13a and Fig. 13b show the received voltage relations in the arrangement of Fig. 13.
Figure 13B:
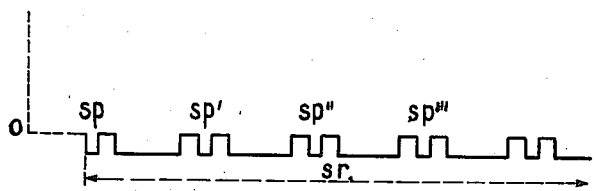

One utilises the pseudo-rectilinear part A B of the first rising limb of such curve, corresponding to the values of the ratio $V/V_m$ included between 0.5 and 0.9. To effect this one applies to the electrodes of the Kerr cell a permanent D. C. potential $V_o = 0.5 V_m$ (corresponding to the point of operation A) and upon this one superposes the voltage (sc) produced by the code signals (Figure 13a). If, on the contrary, one applies a permanent D. C. potential $-V_o$ (corresponding to the point A'), the subsequent application of the code signal (sc) will not produce any luminous effect. The time of establishment or of cessation of the double refraction effect under the action of the electric field being in the order of 10–12 seconds, such a Kerr cell plays the role of an electro-optical relay without inertia.

Figure 14 represents the electrical arrangement of the same telegraphic receiving station using the two Kerr cells K and K', 7 and 8 represent the bus-bars to which are applied the signals received from the corresponding telegraphic transmitting station (that is to say, for example, the signal output of the demodulator of the terminal receiving equipment of a carrier-current channel of a multiplex telephone system over co-axial cable); 16 are 17 are the band-pass filters (having a narrow pass band) corresponding respectively to the "letters" signal and to the "numbers" signal, 18 and 19 are copper-oxide rectifier cells, and 20 is a polarized electro-magnet the armature of which operates an inversion key 21 which in one of its positions, applies the voltage $+V_o$ (supplied by battery 22) to the cell K and the voltage $-V_o$ to the cell K' while, in the other position, it applies, inversely, the voltage $+V_o$ to the cell K' and the voltage $-V_o$ to the cell K. Consequently, when one transmits a group of letters (preceded by the "letters" signal) only the Kerr cell corresponding to the half of the decoding screen 6 carrying the letters is operative and serves to modulate the intensity of the light which traverses it, the other Kerr cell being inoperative and the luminous beam related thereto remaining extinguished (after the analyzer) whatever the difference of potential which exists between the bus-bars 7 and 8.

As shown in Figure 13a the preliminary signals sp, sp', sp'' . . . alternate with the code signals sc, sc', sc'' and have a different polarity. Furthermore after the transmission of 52 characters there is a "return signal" conforming to Figure 1b. The triode valve 9 (Figure 14) has a fixed grid bias, of such value that the synchronisation signals (that is to say the preliminary signals and the return signal) sr, sp, sp', sp'' pass beyond the band of the "grid-volts/anode current" characteristic and consequently cause the passage of an appreciable current through the output resistance (amplitude discrimination). The voltage thus produced at the terminals of such resistance by the synchronisation signals (sp and sr) is applied to a separating arrangement 10 which separates the impulses sp (of short duration) from the impulses (of much longer duration) of the signal *sr* following a principle known in television and referred to previously. The impulses *sp* serve to synchronise an electric motor 11 (for example, a Lacour phonic wheel represented schematically in the attached Figure 14 by an electro-magnet acting on the projecting portions of a toothed wheel of magnetic material): the shaft of said electric motor 11 drives the two mirror wheels R, R'. The signal *sr* acts upon an electro-magnet 12, the armature of which controls the movement of a ratchet wheel and pawl mechanism whose shaft *b* drives the winding means of the photographic film 5 in the camera 4 (Figure 13). Each time that 52 characters have been received at the telegraphic receiving station, a signal *sr* is received and the photographic film is advanced one line.

Figure 15 represents schematically the optical arrangement while Figures 4 and 5 represent two embodiments of the electrical arrangements of a telegraphic receiving station according to the first embodiment of the invention employing as electro-optical relays "ionic relays" the principle of which is described in French Patent No. 637,652, and in the additoin No. 3,096 thereto. Said ionic relays are gas or vapor filled electric discharge lamps with an internal coating of a fluorescent substance emitting blue and violet radiations (for example a coating of tungstate of calcium). S represents the surface on which are distributed 52 "ionic relays" of the above kind of which one only (lamp L*p*) is shown in Figures 16 or 17. Each ionic relay comprises a bulb (containing, for example, a rare gas such as neon, argon or helium at low pressure, or alternatively a little argon with a globule of mercury in order to obtain the mercury vapor at low pressure); the hatched part of said bulb in the figures is the coating of tungstate of calcium $WO_4Ca$ which the fluorescence is excited (when the principal electric discharge is produced between the electrodes *ap* and A*p*), either by the mercury lines 736 to 740 angstrom units, or by the mercury line 2537 A°. The voltage $E_A$ established between the electrodes *ap* and A*p* is less than the value necessary for the starting of the electric discharge between such electrodes (principal dischrage), but if the electric particles emitted by the cathode *kp* are able to traverse the control grid *gcp* and the screen grid *gep* and reach the perforated anode *ap*, that is to say, if the "auxiliary discharge" is able to be set up between *ap* and *kp*, certain of these particles pass through the perforation of *ap* and penetrate into the space located between *ap* and A*p* and thereby initiate the principal electric discharge and, consequently, the luminescence of the fluorescence coating. One such lamp L'*p* combines therefore within the same bulb a "thyratron" or gas or vapor relay (enlarged portion of the bulb) and an electric gas discharge tube with fluorescent coating; it is this fluorescent coating which is the part used for application to the telegraphic receiving station according to the invention, and all the rest of the bulb of the lamp L*p* is blackened externally. Moreover as the electric discharge in the gas (or vapor) at low pressure and low temperature is a little luminous by itself, in a preferred form of the lamp L*p*, an opaque tube (of ceramic material, for example) surrounds the cathode which may consist of cesium. This tube, which serves to support the control grid and the screen grid and which serves also to canalize the electric corpuscles, masks the larger portion of the luminescent discharge in the gas or vapor.

The assembly of the parts of the 52 lamps L*p* covered by the fluorescent substance distributed over the surface S replaces the fluorescent screen 3 of the cathode-ray oscillograph of the arrangement described previously. Behind said surface S is a reflector arrangement, not shown while in front of said surface S is the decoding screen carrying the 52 characters (letters, numbers or other signs) each one being so placed with respect to the luminescent part of the corresponding lamp L*p* and oriented in such manner that the images of such 52 characters in traversing the optical system $L_1$, $L_2$ become superposed through the aperture F of the camera 4 on the same point of the photographic film 5. As in Figure 7, $L_1$ is in this case a concavo-convex spherical lens against one face of which are placed 52 spherical lenses in juxtaposed relation and having as their respective foci the 52 characters of the decoding screen 6. $L_2$ is a spherical lens (or a system of spherical lenses) the focus of which is on the photographic receiving film 5. In the present case the reception is assumed to be effected "by strip" so that the film 5 is a narrow ribbon positioned in an intermittent manner by means of an eccentric mechanism of the type employed by Demeny in the Nogues high speed cinematograph apparatus. An electric motor M (Figure 16) synchronised by the preliminary signal *sp* (and which is for example a Lacour phonic wheel) drives the two sprocket cylinders $C_1$, $C_2$ in a continuous manner and at the same speed, so that $C_1$ furnishes the exact quantity of film which is pulled through by $C_2$. Periodic arresting of the film (passing in front of the window F) is obtained by the action of the cam or eccentric E situated between the window F and the cylinder $C_2$. This cam E is very light in order to permit operation at high speed and without vibration, and turns in the direction of the arrow *f*. The film 5 is bent around the said cam, which during a part of its rotation, adds its effect to that of the cylinder $C_2$ and contributes to the pulling through of a much greater length of film in front of the window F than would be pulled through by the said cylinder itself. During the other part of its rotation the cam recedes and ceases to be effective, so that cylinder $C_2$, before beginning to pull through any fresh film, is compelled to absorb the small excess accumulated below the window by the action of the cam. During this operation, the portion of the film which is opposite the window remains stationary; this immobility is furthermore rigorously assured by the action of the metallic member B of appropriate form, against which the film is thrown by the cam and becomes pressed, the inertia of the film being absorbed in the shock, the accuracy of the point of arrest being assured by a pair of small claws which engage the perforations of the film and complete its immobilization.

During such a reception by strip, to economize the photographic film one may utilize a slender ribbon of film with a single perforation along its median line; to render the unwinding mechanism symmetrical and reversible, one may utilize the lower part of the film situated below the perforation for receiving the first part of a series of telegrams, and afterwards reverse the direction of unwinding and utilizing the upper part (situated above the perforation) for receiving the second part of said series of telegrams.

Figure 15B:
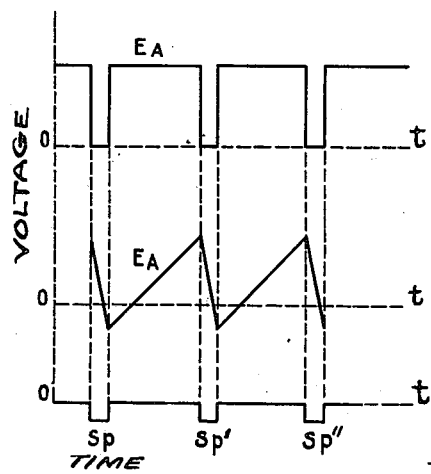
Fig. 15b shows wave forms for a number of different received signals as separated and amplified and applied to the input of the two-grid thyratron tube.
Figure 15A:
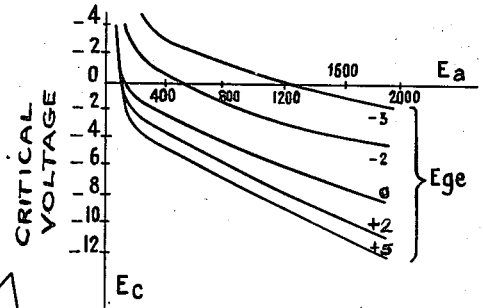
Fig. 15a shows thyratron characteristic curves of the two-grid thyratron tube as used in the arrangement of Fig. 16, and the critical voltage.

Figure 15*a* represents the family of characteristics of a bi-grid thyratron (that is to say the enlarged part of the lamp $L_p$ of Figures 16 and 17), said curves giving for various values of the voltage $Ege$ between the cathode $Kp$ and the screen grid $gep$, and for various values of the voltage $Ea$ between the cathode $Kp$ and the perforated anode $ap$, the value of the "critical voltage" $Ec$ which has to be established between the cathode $Kp$ and the control grid $gep$ so that the auxiliary discharge starts between said cathode $Kp$ and the perforated anode $ap$, and the principal discharge is started between the perforated anode $ap$ and the electrode $Ap$.

In Figures 16 or 17, 7 and 8 represent the bus-bars to which are applied the signals ($sp$, $sc$) emitted by the transmitting station, said signals having the waveform shown in the attached Figure 13a. The valve 9 separates the preliminary signals $sp$ (amplitude discrimination) and amplifies them to the value $t$, so that between the electrodes $ap$ and $Ap$ of the 52 lamps such as that shown at $L_p$ is applied a voltage of rectangular waveform and of amplitude $E_A = P - t$ as represented at the top of Figure 15b. The voltage $t$ is transmitted by the condenser C to the grid of the tube 10 which is a thyratron (gas or vapor filled triode) producing (due to the condenser C' and the resistance R') relaxation oscillations $t'$ to which is opposed the E. M. F. of the battery P'. There is thus obtained a voltage $Ea = t' - P'$, the wave-form of which is shown at the middle of Figure 15b and which is applied between the cathode $kp$ and the perforated anode $ap$ of the 52 lamps such as $L_p$. At the top of Figures 16a and 17a there is reproduced, on a larger scale, the variations of said voltage $Ea$ as a function of time, as well as the corresponding variations of the critical voltage of the control grid $Ec$ (deduced from the characteristics of Figure 15a related to the "thyratron" section of the 52 lamp $L_p$).

Said 52 lamps $L_p$ form two groups of 26 lamps corresponding, respectively, to the 26 letters and to the 26 numerals or other signs. In Figures 16 and 17, is to be found the arrangement of band-pass filters 16, 17, rectifier cells 18, 19 and a polarized relay 20 the armature 21 of which (by means of the battery 22) polarizes the screen grids $gep$ of the lamps $L_p$ of each group of 26 lamps either positively or negatively with respect to the cathode $kp$, according to its position.

As shown by Figure 15a, if the screen grid has too great a negative polarization, the critical voltage $Ec$ of the control grid becomes too high for the discharge ever to take place. According as the armature 21 of the relay 20 is in one or the other of its positions (that is to say according as the preparatory "letters" or "numbers" signal has been received) one of the two groups of 26 lamps $L_p$ (corresponding to letters or to numbers) is blocked.

Figure 16A:
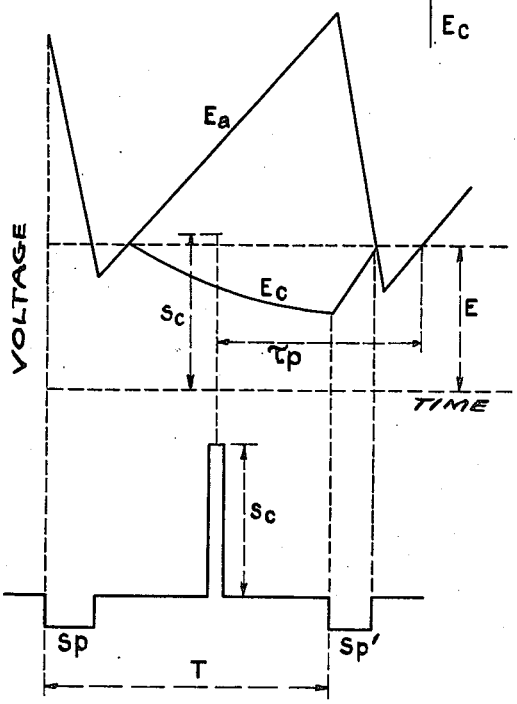
Fig. 16a shows the time discharge characteristics and voltage relations with reference to signal elements for the two-grid thyratron fluorescent tube.

In the case of the electrical arrangement shown in Figure 16, the control grids $gep$ of the 26 lamps $L_p$ of a common group are connected (by means of brushes $bp$ pressing on the surface of a distributor D) successively to the bus-bars 7, 8 over which the code signals arrive. The distributor D (shown in perspective in Figure 16) comprises helicoidal portions $a_1$, $a_2$, $a_3$, $a_4$, electrically insulated from the metal body of said distributor. Such helicoidal portions are connected together electrically, and (by means of a slip ring not shown in Figure 16) are connected to the bus-bar 7; the body of the distributor D is connected to the bus-bar 8 which is connected to the cathodes $kp$ of the lamps $L_p$ by way of a battery E which gives to the control grids $gep$ of the lamps $L_p$ a negative bias of fixed value E. E is slightly lower than the amplitude ($sc$) of a code signal, but is higher than the maximum ordinate of the curve $Ec$ (Figure 16a). In Figure 16 the distributor D has been shown in the particular position where the brush $bp$ connected to the control grid $gcp$ of the lamp $L_p$ is in electrical contact, through the metal portion $a_1$ with the bus-bar 7, so that the voltage existing at the instant between the cathode $kp$ and the control grid $gcp$ is $E - sc$; the critical potential $Ec$ is therefore exceeded for this particular lamp $L_p$ and the electric discharge is initiated in said lamp. If in the optical arrangement of Figure 15, the fluorescent part of the lamp $L_p$ is located just opposite to a particular $P^{th}$ of the decoding screen (letter which corresponds to the code signal $sc$ represented at the bottom of Figure 16a) the desired letter is properly marked on the photographic receiving film 5.

The distributor D (Figure 16) is driven (at a constant speed) by the electric motor M (represented schematically in perspective by a cube in dotted lines in Figure 16) synchronized by the preliminary signals separated by the triode 9; such synchronization is such that the distributor D makes $1/n$th part of a turn during the interval of time T separating two consecutive preliminary signals $sp$, $sp'$ . . . where $n$ is the number of helicoidal portions $a_1$, $a_2$ . . . of the distributor D. All the brushes $bp$ corresponding to the 26 lamps of a single group are aligned on the same generatrix of the distributor D, and the beginning (to the left) of one helicoidal part ($a_2$ for example) passes under such generatrix immediately after the extremity (to the right) of the preceding helicoidal part ($a_1$). During the period T, the discharge is started only in the lamp $L_p$ the related brush $bp$ of which is so positioned that the code signal $sc$ arrives at the bus-bars 7, 8 exactly at the moment when the active helicoidal portion passes beneath such brush $bp$. When the principal electric discharge is established between $ap$ and $Ap$, the fluorescent coating (hatched part of the lamp $L_p$) becomes luminous. Such fluorescent light (blue violet in the case of tungstate of calcium) is maintained by the principal electric discharge during the period of time $\tau p$ (Figure 16a) until the ions are recombined within the bulb $L_p$. By a suitable choice of the value of the E. M. F. of the battery P' and consequently, the duration of the negative alternation of the oscillation $Ea = t' - p'$ (Figures 15a and 16a), and by convenient adjustment of the luminous intensities $ip$ of the various lamps $L_p$ (in some circumstances, by means of photographic means), one may obtain, for the 52 characters, equal values for the products $ip$ times $\tau p$ and consequently obtain markings of equal strength (for each of the 52 characters) upon the photographic receiving film 5 (Figure 15). If the distributor D possesses $n$ helicoidal portions $a_1$, $a_2$ . . ., it affects only $1/52\, n$ part of a turn during the duration of transmission of one telegraphic character; the motor M which drives it may be a Lacour phonic wheel (of the type represented schematically at 11 in Figure 14) with a magnetic rotor having $n$ teeth.

In the case of the electrical arrangement shown in Figure 17 each control grid $gep$ of the lamps $L_p$ (in one of the two groups of 26 lamps) is connected to the corresponding cathode $kp$ by a series arrangement, comprising: firstly a battery producing an auxiliary bias potential $e'p$; secondly, the output of the $p$th section of an artificial line L which receives the voltage $ep$ of triangular wave-form and of amplitude ($ep$ max); thirdly the resistance 212 connected between the busbars 7, 8 and fourthly, a battery producing the principal negative bias E. The artificial line L is supplied by a multivibrator constituted by two triodes 11, 12; the grid of each one of these triodes being connected to the plate of the other triode by a condenser $c$.

This multivibrator is synchronized by the preliminary signals $sp$ emitted by the transmitting telegraph station and taken from the output of the tube 9; the arrangement of this multivibrator is entirely symmetrical, so that it generates a wave having a form of an isosceles triangle; this wave-form is attenuated and phase-displaced progressively in the course of its propagation through the successive sections of the artificial line L. By convenient adjustment of the voltage of the auxiliary bias $s'p'$, one can give to the expression $(E-(ep)$ max$-e'p)$ (that is to say, at the minimum of the voltage between the control grid $gep$ and the cathode $kp$) equal values for each one of the 26 lamps $L_p$ of the same group, this value being exactly equal to the amplitude $sc$ of a code signal (Figure 17a). In order that the discharge is started in one of said lamps ($L_p$ for example), and consequently in order that the corresponding character is illuminated on the decoding screen 6 (Figure 15), it is necessary that the impulse ($sc$) arrives at the telegraph receiving station exactly at the instant $t$ when the voltage $(E-ep(t)-e'p)$ between the control grid $gcp$ and the cathode $kp$ of said lamp $L_p$ passes through its minimum. As shown by Figure 17a, this minimum only takes place for a single one of the lamps at each given instant, and such lamp alone is therefore ignited by the impulse $sc$; for the 25 other lamps of the same group the balance of the voltage is insufficient to start the discharge. The correct telegraphic reception thus obtains automatically if one places the fluorescent portion of said lamp $L_p$ opposite to the $p^{th}$ letter traced upon the decoding screen 6 (Figure 15). The electric motor M driving the unwinding mechanism of the strip of photographic receiving film 5 (Figure 15) is represented schematically in Figure 17 by an electro-magnet acting upon a toothed wheel of magnetic material (Lacour phonic wheel). In the case of the arrangement of Figure 16 the shaft of the motor M must drive, not only the unwinding mechanism of the film 5, but also the distributor D and overcome the friction of the brushes $bp$, this limits somewhat the obtainable speed of telegraphic transmission. In the case of the arrangement of Figure 17 the motor M has to effect only the unwinding of the film, all the rest of the apparatus being stationary. This permits a somewhat greater speed of telegraphic transmission. In Figure 17, the artificial line L is represented schematically in the form of a low-pass filter (ladder type of artificial line composed of sections of T or $\pi$ form and comparable to a pipinized transmission line (that is to say, loaded with series inductance coils); one may naturally use other forms of artificial lines to create the required phase-displacements between the various isosceles-triangular wave-form represented at the middle of Figure 17a. On the other hand, such a triangular wave-form comprises, in addition to the fundamental component, numerous harmonic components which are essential for maintaining such triangular form with an apex which is sharp, necessary to the proper functioning of the telegraphic receiving station. If one utilizes an artificial line L according to Figure 17 (low-pass filter), the phase-displacement $a$ per section varies as a function of the frequency $f$ according to the formula $$a = 2 \text{ arc } \sin\left\{\frac{f}{fc}\right\}$$

$fc$ designating the cut-off frequency and in consequence $a$ is not proportional to the frequency $f$, in the high frequency region, that is to say, for the harmonic components; in order to remedy such phase-distortion, one may associate with each T-section (or each $\pi$-section) of the artificial line L a phase-compensating section of lattice form, of such kind that the sum of the phase displacements of the T-section (or of the $\pi$-section) and of the lattice-section are proportional to the frequency $f$ for all the essential harmonic components of the isosceles triangular wave-form generated by the multivibrator 11, 12.

On the other hand, in order to avoid (or to reduce to a minimum possible value) the wave reflections at the extremity of the artificial line L, said line must be terminated by an appropriate two-terminal network (conveniently represented in schematic form in Figure 17 by an impedance Z), the impedance of such two-terminal network being equal to the impedance of the line L as seen from such termination in the direction of the multivibrator 11, 12, for all the component frequencies (fundamental and harmonics) essential to the isosceles triangular wave-form generated by said multivibrator.

The ionic relays of Figures 15, 16 and 17 have a coating of fluorescent substances (tungstate of calcium, for example) without luminous persistence after their excitation; nevertheless as the electric discharge (which produces such fluorescence) persists during the interval of time $\tau p$, one obtains an effect equivalent to phosphorescence. Instead of employing an ionic relay with fluorescent coating, one may utilize directly the luminescence of the electric discharge in a gas or vapor which produces a light containing the blue, violet or ultra violet radiations which act well on the emulsion of the receiving photographic film; this is the case for mercury vapor or krypton for which the majority of the rays contained in the visible spectrum are in the blue or the indigo region and xenon which gives a mauve-purple light with intense rays in the blue and indigo.

Figure 18 represents schematically a telegraphic receiving station according to the second embodiment of the invention, in which the preliminary signal $sp$, $sp'$ and the code signals $sc$, $sc'$, $sc''$ (applied over bus-bars 7 and 8) have the form shown in section (a) of Figure 19, each character (letter, number or punctuation sign) being characterised by the amplitude of the corresponding code signal. The receiving station of Figure 18 utilizes an electro-optical arrangement comprising, on one hand, an ionic relay constituted by the arrangement in series with the thyratron T$h$ and with the luminescent tube TL, and electro-mechanical relay G1 (a galvanometer with two differential windings $e1$, $e2$ and a mirror $m_1$ oscillating about the vertical axis A1) and an electro-mechanical relay G2 (a galvanometer with mirror $m2$ oscillating about the vertical axis A2), said electro-mechanical relays G1, G2 are similar to those used in mirror oscillographs or in sound recording on cinematograph films; they must be dead-beat (either mechanically, as a result of the friction of the moving element against a viscous body such as oil, or elastic like sponge rubber or electrically by means of an electric resistance mounted in shunt). In particular, it is expedient to shunt by such a damping resistance the winding $e2$ of the galvanometer $G1$ flowed through by the code signals in order to avoid the ballistic overswing of the oscillations of the mirror $m1$ with respect to the position which such mirror should occupy during the maximum amplitude of the code signal (height of the horizontal level of the signal $sc$ above the time-axis $Ot$).

In Figure 18, the decoding screen, carrying the 52 characters as transparencies upon an opaque background (say 26 letters between X and Y, separated by a small opaque space from 26 numbers or other signs between Y and Z), is represented at 6 in the form of a strip of a cylinder of circular base, the axis of which is the vertical $A1$ about which the mirror $m1$ oscillates; the luminescent tube TL (which has the form of a portion of a torus of axis $A1$), illuminates momentarily the transparent parts of the screen 6 which play, in this case, the role of luminous objects. Supposing P be one of the characters illuminated; suppose P' is the image of P in the mirror $m1$; suppose P'' to be the image point of P' with respect to the lens L. The image P''' of P'' in the mirror $m2$ of the galvanometer G2 (mirror oscillating about the vertical $A2$) is formed in a point of the receiving photographic film 5 carried by a drum actuated by an intermittent rotary movement under the action of a ratchet wheel 14 controlled by the return signals $sr$. The movement of the mirror $m2$ of the galvanometer G2 is controlled by the preliminary signals $sp$. When the mirror $m1$, under the control of the code signals $sc$, takes up various positions about the axis $A1$, it reflects in P'' the images of the various characters of the screen 6, since the circle has as center the middle of the axis $A1$, the radius $A1P$ (median circle of the decoding screen 6) being the middle of the conjugate points of the fixed point P' with respect to the mirror $m1$, when such mirror $m1$ turns about the axis $A1$. The winding $e1$ of the galvanometer G imparts to the mirror $m1$ a position of rest corresponding either to the opaque portion X which is at the beginning of the letters, or to the opaque portion Y which is at the beginning of the numbers or other signs, so that at rest no light rays fall upon the point P''' of the receiving film 5. This result is obtained by means of the narrow band pass filters 16, 17 (which separate respectively the "letters" signals and the "numbers" signals) associated with the rectifier cells 18, 19, and the polarised electromagnet 20, the armature 21 of which connects (according to its position) one of the terminals of the winding $e1$ of the galvanometer G1 either to the positive terminal, or to the middle of the battery 22, the negative terminal of said battery being connected to the other terminal of the winding $e1$. If one has received the "letters" signal over the bus-bars 7, 8, the armature 21 is against the right hand abutment, and the mirror $m1$ is (Figure 18a) biased in a position of rest corresponding to the point X. If one then applies to the differential winding $e2$ a code signal $sc$ of duration $\theta$ and of sufficient amplitude to turn the mirror $m1$ through an angle equal to half the angle $XA1P$, the mirror $m1$ (after such rotation) reflects to the point P''' (Figure 18a) the image of the letter which is found at P, and this condition prevails during the part of the interval of time $\theta$ in which the luminescent tube TL is the carrier of an electric discharge illuminating such letter. The cathode and the grid of the triode 12 are connected to the bus-bars 7, 8, and said grid is biased in such manner that only signals of positive polarity (section $b$ of Figure 19) flow in the anode circuit and pass through the winding $e2$ of the galvanometer G1 (amplitude discrimination).

The triode valve 9 likewise has its cathode and its grid connected to the bus-bars 7, 8, but this grid is biased in such manner that only the preliminary signals $sp$ (section $c$ of Figure 19) of negative polarity, flow in the anode circuit. One thus obtains the voltage $t$ (of the wave-form resembling that of section C of Figure 19 but amplified) which is put in opposition to the direct voltage of the battery E to obtain the rectangular voltage $(E-t)$ represented in section $d$ of Figure 19. This voltage charges the condenser C, the voltage between the plates of such condenser C rising rapidly and exceeding the value sufficient to start the electric discharge in the luminescent tube TL; the thyratron $Th$ is however opposed to such discharge as long as the voltage between its control grid and its cathode remains below the critical voltage. This control grid is connected to the output of a phase-changing arrangement D1 fed by the triode 11, the latter is fed in its turn (by means of condenser K) by the voltage $t$ in such manner that the voltage of the output terminals of D1 has the form shown in section $e$ of Figure 19. This comprises impulses $sp1$, $sp'1$, $sp''1$ ... inversions of the preliminary signals $sp$, $sp'$, $sp''$, and phase-delayed with respect to the letter by an amount corresponding to the duration of a preliminary signal $sp$ augmented by the initial transient time of a code signal $sc$ (the rectilinear rising portion of said signal $sc$). It is therefore only at the instant $t1$ that the thyratron $Th$ begins to conduct and that in consequence thereof the condenser C is discharged through the luminescent tube TL. On the other hand, the cathode anode path of a triode 13 constitutes a resistance shunting the source of voltage $(E-t)$ which feeds the luminescent tube TL; the grid and the cathode of said tube 13 are connected to the output of a second phase-displacing arrangement D2 fed by D1 and at the terminals of which is received the voltage the wave-form of which is represented in section $f$ of Figure 19; this comprises positive impulses $sp2$, $sp'2$, $sp''2$ ... phase-displaced with respect to the impulses $sp1$, $sp'1$, $sp''1$ by an amount corresponding to the semi-transparent period of the code signal $sc$ (horizontal level of such signal $sc$); the valve 13 thus constitutes a high resistance during the interval of time which passes between two consecutive impulses $sp2$, $sp'2$, but on the contrary, it constitutes a resistance of very low value during the duration of each one of such impulses ($sp2$ for example). In consequence thereof, at the instant $t2$ the luminescent tube T1 ceases to be fed. It thus results that the brillance of such tube is intermittent and varies as a function of the time conforming to the section $g$ of Figure 19. The various characters of the decoding screen are only illuminated during the semi-permanent period of the code signals and consequently no illumination is projected to P''' (Figure 6) during the transit periods of the mirror $m1$ of the galvanometer O1 passing from its position of rest to a working position or vice versa; on the contrary, during the interval of time when the mirror $m1$ rests at a working position, the image of the desired character corresponding to such position does not cease to impress the point of the photographic film 5 on which is found the image P''' during such interval of time.

The voltage $t$, corresponding to the amplified preliminary signals $sp$, $sp'$, $sp''$ (section $c$ of Figure 19) is also applied to the synchronising circuit of an electric motor M fed by S and the shaft $a$ of which drives a metal brush $\beta$ (partly not hatched) which connects successively a continuous metallic ring $\gamma$ to the 52 metallic sectors of a concentric ring $\gamma 1$; these 52 sectors (only 16 of which are shown in Figure 18) are separated one from the other by a thin insulating portion, and are connected to various points of a resistance R inserted between a battery 15 and the winding of the galvanometer G2. The brush $\beta$ rotates with a constant speed and passes over the insulating portion separating two consecutive sectors at the moment of each preliminary signal $sp$; at this instant the intensity of the current passing through the winding of the galvanometer G2 varies abruptly; consequently the mirror $m2$ passes rapidly from one to the other of the 52 positions corresponding to the 52 successive locations of the image P''' on the 52 points of a line of text on the photographic receiving film 5. On the other hand, the mirror $m1$ remains stationary during the whole of the pediod (semi-permanent) of a code signal $sc$.

To augment the illumination on the receiving photographic film and also to economize the film it is desirable; firstly, to utilize a lens L of short focal length and of large aperture, so that the image P''' is small with respect to the area of a character of the decoding screen 6 (this area is moreover preferably a rectangle having a width following the arc of circle XYZ, for example, half of the height), secondly, to reduce the radius A1P of the cylinder of which the screen 6 is a strip. One may, to this end, dispose the various elements of the optical arrangement of Figure 18 as shown in Figure 18a which is a vertical section in a plane passing through the axes A1, A2, about which the mirrors $m1$, $m2$ oscillate. The mirror $m2$ is placed between the mirror $m1$ and the lens L, which latter is arranged near the film 5 where the image P''' of the character P is formed; in Figure 18a the transverse section of the luminescent tube TL is represented by a circle.

Figure 20 represents schematically in perspective the optical arrangement and Figure 21 the electrical arrangement of a telegraphic receiving station according to the second embodiment of the invention, in which the preliminary signals $sp$, $sp'$, $sp''$ and the code signals $sc$, $sc'$, $sc''$ (applied over bus-bars 7, 8) have the form shown in Figure 20a, each character being characterized by the amplitude of the corresponding code signal $sc$.

The luminescent source $s$ is, for example, a high-pressure mercury-vapor lamp similar to that of Figure 13; all its surface is blackened except a luminous square (part unhatched in Figure 20). The image $s1$ of this luminous square, after passing the lens L1 and by reflection on the plane mirror $m$ of the galvanometer G is formed on the left end half of the small plane mirror $m1$ of the galvanometer G1 (oscillating about the horizontal axis $h$), when the mirror $m$ is at rest. M is a spherical mirror, the center C of which coincides with the center of mirror $m1$ and the entire surface of which is blackened except the 26 letters and the 26 numbers of other signs juxtaposed on the strip B. If the mirror $m$ is at rest, one of said characters is illuminated by the light beam which diverges from the image $s1$ of the source situated on the left of $m1$; the character illuminated depends upon the position of the mirror $m1$ turning about the horizontal axis $h\ h'$.

Suppose that P is the position of the strip B thus illuminated (represented by a hatched rectangle); it plays the role of a luminous object the image of which by the lens L2 is formed on the photographic receiving film 5 after reflection by the mirror $m2$ (of the galvanometer G2) which oscillates about the vertical axis $v\ v'$. $s2$ is the image of $s1$ in the spherical mirror M; it is symmetrical to $s1$ with respect to the center of the small mirror $m1$; one therefore has a luminous cone diverging from $s1$ to P and converging from P to $s2$ but diverging again from $s2$ to L2 and then converging from L2 to the image on film 5. The position of the mirror $m1$ determines the choice of the character on the strip B of the spherical mirror M, while the position of the mirror $m2$ determines the geometrical position of the character thus chosen on the line of text of the received telegram on the photographic film 5.

As in the case of the mirror $m1$ of Figure 18, the mirror $m1$ of Figure 20 has two different positions of rest according to the voltage applied to the winding $e1$ of the galvanometer G1 controlling the mirror $m1$, that is to say, according to the position of the armature 21 of the polarized electro-magnet 20 (Figure 21) connected to band-pass filters 16, 17 through the rectifier cells 18, 19; when, for example, the "letters" signal is received, such signal passes from bars 7, 8 to the filters 17 and afterwards through the rectifier 19, into the electro-magnet 20, the armature of which takes up the position shown in Figure 21, and the mirror $m1$ then takes up the first position of rest corresponding to the extremity of the half of the strip B (of the mirror M) carrying the letters. On the other hand, the cathode and the grid of the triode 11 are connected to the bus-bars 7, 8 and said grid is biased in such manner that only the code signals (voltage $u$ represented in the middle of Figure 20a) passes through the anode circuit of said valve 11; these code signals $sc$, $sc'$ act successively on the differential winding $e2$ for giving to the mirror $m1$ successively the positions corresponding to the different letters characterized respectively by said code signals $sc$, $sc'$, $sc''$.

The winding of the galvanometer G controlling the mirror $m$ is supplied with a voltage $$\left(\frac{du}{dt}\right)$$

derived from the voltage $u$ by means of the known arrangement of a condenser in series with a resistance; this voltage $$\left(\frac{du}{dt}\right)$$

has the form shown at the bottom of Figure 20a; it comprises an impulse (positive or negative) during each one of the transient periods previously referred to, and said impulses in moving the mirror $m$ from its position of rest, prevent the light emitted by the source $s$ from impinging on the mirror $m1$ during said transient periods (initial and final) of each code signal;

consequently no luminous rays hit the receiving photographic film (Figure 8) during such periods.

The galvanometers G, G1, G2 controlling respectively the mirrors $m$, $m1$ and $m2$ should be strongly damped (either electrically or mechanically), for avoiding or reducing the ballistic overswing of the oscillations with respect to the position required each time for each one of said mirrors.

The cathode and the grid of the triode 9 (Figure 21) are connected to the bus-bars 7, 8; but the grid of said triode is biased in such manner that only signals of negative polarity, that is to say, the preliminary signals $sp$ flow in its anode circuit (amplitude discrimination).

The preliminary signals $sp$ act on the synchronizing circuit $b$, $b'$ of the electric motor M fed by the source S. This motor drives the brush $\beta$ of the rheostat R, so that the mirror $m2$ (controlled by the galvanometer G2) turns through a small angle, at the moment of each preliminary signal, and the image on the photographic film 5 (Figure 20) is displaced each time by a length equal to the width of one character on one line of the received telegraphic text; when 52 characters are thus marked on the considered line of the film 5, the latter is advanced by one line in the direction of the arrow $f$, under the action of the ratchet wheel 14 driven by the motor M; at the same time the image returns rapidly to the beginning of the following line of the film 5 because the resistance R is abruptly cut out of circuit.

In the optical set up of Fig. 20, the actinic radiations (blues, violets and ultra-violets) emitted by the quartz lamp $s$, traverse the lenses $L_1$ $L_2$ of material transparent to such radiations (quartz, uviol glass, etc.) and are reflected by the mirrors $m$, $m1$, $m2$ of material having a large reflecting power for such radiations (aluminum, nickel, etc.) so that they act directly on the emulsion of the photographic film 5 (the support of which is also of material transparent to such radiations). But one may also pass the film 5 between two "intensifier" screens of the type used in X-ray photography or in the radioscopic cinematography (screen coated, for example, with tungstate of calcium). The emulsions placed against these screens (either in front or behind) are then affected at the same time by the direct action of such radiations and by the radiation due to the intensifier screens which augment the intensity of the effect.

Similarly in the optical arrangement of Figure 18 one may utilize as the luminescent tube TL a mercury vapor tube with quartz envelope without fluorescent coating and omit the decoding screen 6 by blackening the exterior wall of such tube, except for the particular areas conforming to the characters (letters, number or other signs) which remain transparent on a black background; the mirrors $m1$ $m2$ having a good reflecting power for the blue radiation emitted by tube TL and the lens L being likewise transparent to these radiations as well as the support of the film 5, one may place such film between two intensifier screens of the type previously referred to.

In the optical arrangement of Figure 15, one may likewise omit the fluorescent coating of the ionic relays $L_p$ which may in that case be quartz lamps (filled with mercury-vapor, for example), as well as the decoding screen 6, the characters being directly traced on the opaque coating of each bulb $L_p$ (by removing the substance over the area of each character on the small part of each lamp $L_p$; the lenses $L1$, $L2$ being of material transparent to the blue, violet and ultraviolet radiations emitted by said lamps $L_p$; one may similarly place intensifier screens in the vicinity of the window F, to one side or the other of the photographic film 5.

Finally, in the optical arrangement of Figure 13, one is able similarly to do away with the phosphorescent screen 3—using as decoding screen a screen diffusing the blue, violet and ultra-violet radiations emitted by the lamp $s$; and placing the photographic film 5 between two intensifier screens carrying coatings of phosphorescent substances (pure sulphide of zinc activated by a thermal process, for example), all the optical elements $L'1$, $L'2$, $L'3$ $pa$ being transparent to said radiations and the mirror wheels R, R' having good reflecting power for said radiations.

The attached Figure 22 shows an embodiment using as electro-optical device at the receiving station a cathode-ray oscillograph 1 with two electron beams separated by an electro-magnetic screen 2, as in the case of Figure 10, 3, 3', are the two cathodes, 4, 4' the corresponding Wehnelt cylinders; 14 is the coil causing the vertical scanning of the fluorescent screen (of tungstate of calcium, for example) in front of which is placed the decoding screen 6; such coil 14 is fed by the code signals $sc$ (section ($a$) of Figure 23) which are separated by the triode 10 shunted across the bus-bars 7, 8. 16 is the coil causing the horizontal deflection. The polarized electro-magnet 20 (controlled by the "letters" signal or the "numbers" signal through band-pass filters 16, 17 and rectifiers 18, 19) operates the key 21 which serves to cut out one or the other of the cathode beams according to whether one receives the letters or the numbers (or other signs).

But in the present case, the "return" bar of the manual keyboard at the transmitting station (Figure 8) is omitted—and one no longer interrupts (during a time $to$) all the signals—the code signals $sc$ as well as the preliminary signals as is indicated with reference to Figure 10. In the present case, the return of the scanning spot is carried out automatically for every 52 characters (including the necessary spaces transmitted by striking the "spacing" key of the keyboard).

To this end, the preliminary signals $sp$ are separated by the triode 9 shunted across the bus-bars 7, 8 of the receiving station and they synchronize (by means of the brushes $b$, $b'$), the motor M fed by the source of electric energy 8. On the shaft $a$ of this motor (represented schematically) are keyed the two metallic brushes $\beta1$, $\beta2$ of the two selector switches or commutators C1, C2. The commutator C1 has a plain inner metallic ring $\gamma1$ connected to one of the terminals of the coil 15 the other terminal of which is connected to one terminal of a battery P1, and an external ring $\gamma'1$ divided into 52 equal metallic segments separated one from the other by thin insulating sheets; these various segments are connected to the various taps of the rheostat R, one end of which is connected to the other terminal of the battery P1. When the brush $\beta1$ turns (driven by the shaft $a$ of the motor M), the value of the current passing through the coil 15 increases by successive jumps equal to one another (passing abruptly from one value to the following); at the end of the 52nd stop, such intensity returns abruptly to its initial value; these variations as a function of time are represented in section (b) of Figure 23.

The commutator C1 therefore causes (by the rotation of its brush β1) the scanning spot to progress along the length of a horizontal line of the decoding screen 6 by successive rapid jumps and restores such spot rapidly from the end of one horizontal line to the beginning of the following line. The motor M drives, on the other hand, the unwinding device of the photographic receiving film (not shown in Figure 22) by means of a gearing including a Maltese cross element, which causes the film to progress by the thickness of a line of text after each group of 52 characters.

The role of the rotary switch C2 is to extinguish the cathode beam in service, (that is to say the one not cut-out by the key 21) during the initial and final transient period of the code signals sc; this rotary switch comprises a plain inner metal ring γ2 connected to the cathodes 3, 3' of the cathode-ray oscillograph 1, and a ring γ'2 divided into 2×52=104 metal segments, a wide segment alternating with a narrow segment, and two adjacent segments being separated one from the other by a thin insulating sheet. The wide segments are electrically connected with one another and also to the negative terminal of a battery P2, the voltage of which is a little higher when half the E. M. F. of the battery 22. The narrow segments are electrically connected with one another and also to the positive terminal of the battery P2. Finally the negative terminal of the battery p2 is connected to the mid-point of the battery 22.

When the brush β2 of the communtator C2 passes over a wide segment, it connects the points P and Q directly with each other, and the positive terminal of the battery P2 is isolated; when the brush β2 passes over a narrow segment, however, the battery P2 is inserted between the points P and Q in a manner to reinforce the action of the battery 22 upon the Wehnelt cylinder corresponding to the cut-out cathode beam, and, on the contrary, opposes the action of the battery 22 on the Wehnelt cylinder corresponding to the cathode beam which is in service; if the key 21 is, for example, in the position shown in Figure 22, the battery P2 is in opposition to the upper half of the battery 22, and as its E. M. F. is greater than that of the battery 22, the cylinder 4 becomes negative with respect to the corresponding cathode during the interval of time when the brush β2 rests upon the considered narrow segment; the opposite takes place when the brush β2 is on a wide segment. Consequently, the voltage applied between the electrodes 3 and 4 varies in the manner shown in section (c) of Figure 23; the cathode beam 3, 4 (in service under the above assumption) is extinguished during the initial and final transient periods of each code signal sc.

One can, in lieu of the rotary switch C2, use a triode oscillator generating relaxation oscillations of rectangular form (section (c) of Figure 23) synchronized by the signals sp and applied to the cathode-ray oscillograph 1 through an appropriate phase-shifter.

Instead of effecting a recording (on magnetic ribbon) for each manual key-board (Figures 1 or 9), one may associate a plurality of key-boards with the same recorder, and superpose on the same magnetic ribbon the corresponding recordings of the various series of telegrams typed upon the various key-boards simultaneously.

One uses the same signals of synchronization (preliminary signals sp, and if necessary return signals sr) for the various recordings. One attributes to these synchronizing signals a carrier frequency f0, one attributes on the other hand to the code signals sc related to key-board Nos. 1, 2, 3, . . . distinct carrier frequencies f1, f2, f3 . . . respectively. Consequently, in Figures 1 or 8, the negative part of the battery P is replaced by an oscillator of frequency f0, and the positive part of the battery P is replaced by an oscillator of frequency f1 for the first key-board, f2 for the second key-board and so on.

In this case, the point of operation F on the magnetization diagram (Figure 6a) is preferably in the middle of the rectilinear portion MN. The synchronization signals no longer differ from the code signals by their polarity but by their frequency.

In order to render these synchronization signals common to all the simultaneous recordings, it is necessary that the sending cam of one key-board is not engaged with the electric driving motor as the key is touched by the person operating the key-board, but is engaged at a predetermined moment (the same for all the key-boards). This is assured by a central device controlling the automatic starting and stopping devices of all the various emission cams.

At the receiving station the signals related to the series of telegrams transmitted simultaneously are separated by means of electric filters tuned to the carrier frequencies f1, f2, f3 previously referred to.

Instead of recording, at the transmitting station, the telegraphic signals on the magnetic ribbon of Figures 1, 6 or 9, one may record such signals on a photographic film, by means of the known process for recording sound upon film using sources of light modulated by said signals (gas or vapor filled electric discharge lamps, ionic relays, Kerr cells of electric double-refraction or magnetic double-refraction, electro-magnetic relays, etc.); these recordings may be made with variable amplitude and constant optical density, or with variable optical density and constant amplitude.

For the transmission by line one uses in that case photo-electric cells illuminated respectively through each one of the photographic recordings; if the light beams utilized for these illuminations are broken-up (at a distinctive frequency for each photographic recording) which produce a carrier wave of distinctive frequency for each series of telegrams, the photo-electric cells reproducing the telegraphic signals are able to deliver over the same transmission channel as that which connects various distributed telegraphic receiving stations.

The telegraphic code of the second embodiment of the invention (Figures 9 or 11) utilizes completely the time (as well as the interval of linear operation) of the transmission channel connecting the telegraphic transmitting and receiving stations. It is not the same for the telegraphic code of the first embodiment of the invention (Figures 2 or 13) since, in the course of the period T attributed to the transmission of one character, it is only during the short period of the impulse sc that current is transmitted over the line. Nevertheless the employment of two groups of distinct characters (letters, and numerals and other signs) conjugated with the employment of two distinct but synchronized cathode beams (Figure 3) or of two distinct luminous beams (Figure 13) or of two groups of distinct ionic relays (Figures 16 and 17), permits a major progress in such subject. In effect, the same code signal *sc* (brief impulse) is utilized for one letter and for one number or other sign (for example for the letter A or for the sign—as shown in Figure 5), on condition of the association with such code signal of a kind of "switching signal" ("letters" signal or "numbers" signal), of a predetermined frequency, and which serves to render inoperative the undesired half of the electro-optical receiving arrangement (that is to say, to cut out one of the two cathode beams or one of the two luminous beams previously referred to).

One may go still further in this manner to augment the capacity of the transmission channel between the telegraphic transmitting and receiving stations. One may effect for example, three distinct telegraphic transmissions (instead of one only) during the period T indicated in the principal patent (Figure 2 or 24) section (*a*), by utilizing at the transmitting station three manual keyboards associated with the same recorder. In each keyboard one eliminates the "letters" signal and the "numbers" signal, the keys corresponding thereto being for example available for the "spacing between the letters" signal and for another signal. One distributes the 54 keys of which one disposes on each keyboard in six groups of 9 keys, these groups corresponding for example to the sum-totals equal to the frequencies of repetition of said characters in the text to be transmitted. To each group of nine keys, one allots a corresponding predetermined frequency; that is to say the frequencies $f1$ to $f6$ for the six successive groups of the first key-board—the frequencies $f7$ to $f12$ for the six successive groups of the second key-board, the frequencies $f13$ to $f18$ for the six successive groups of the third key-board.

As in the usual key-boards of start-stop or non-rhythmic telegraphic apparatus one disposes underneath the keys code bars which give a material representation of the combination (for each character tapped) of a code signal *sc* (brief impulse conforming to Figure 2) and of a switching signal "*sa*" of predetermined frequency.

By way of example, it will be supposed that at the same moment: firstly, the operator of the first key-board taps the first letter of the first group (characterized by the frequency $f1$)—secondly, the operator of the second key-board taps the middle letter of the third group (characterized by the frequency $f9$)—and thirdly, the operator of the third key-board taps the last character of the sixth group (characterized by the frequency $f18$).

A central distributor combines the recording of successive signals of the three key-boards so that there is simultaneous recording on a magnetic ribbon or on a photographic film at the transmitting station of the signals represented by the four lines of Figure 24.

During the period T separating two successive preliminary signals *sp*, *sp'*, three code signals *sc*, *sc'*, *sc''* (instead of a single one as in Figure 2) are transmitted (*sc* corresponding to the first letter of one group, *sc'* to the middle letter of one group and *sc''* to the final letter of one group; each one of these signals is associated with a train of sinusoidal waves of predetermined frequency, which after filtering, are directed towards a predetermined portion of the electro-optical receiving arrangement; after detecting one obtains a switching signal (*sa*, *sa'*, *sa''*), as the envelope of such train of waves; this switching signal is applied to the blocking electrode of the desired part of the electro-optical receiving arrangement and its effect is to "unblock" such part of the arrangement.

In the case of reception with a cathode-ray oscillograph, such blocking electrode is the second control grid (such as 5 or 5' in Figure 3) of one of the cathode beams associated with a sixth part of the surface of the decoding screen 6 corresponding to one of the three simultaneous telegraphic receptions; in the case of reception with ionic relays, such blocking electrode is constituted by the assembly of the screen grids (such as *gcp* of Figure 16 or 17) of one of the six groups of nine ionic relays corresponding to one of the three simultaneous telegraphic receptions.

In the first case (cathode-ray oscillographs)

$$\frac{T-\tau}{3}$$

is the duration of scanning of one vertical line of one-sixth of the phosphorescent screen by the end of one of the sixth synchronized cathode beams. As this period is very short it is of interest to control the vertical deflection of said cathode beams by relaxation oscillations of isosceles triangle form generated by a multi-vibrator of symmetrical arrangement synchronized by the preliminary signals *sp*, *sp'*.

One thus utilizes, for the scanning, both the outward and the return movements of the scanning spot.

For effecting thus a simultaneous transmission of three series of telegrams between two distant and separated telegraphic stations, one may utilize for example two telegraphic channels of a multiplex telephone system over a co-axial cable; one of these channels serving for transmitting the code signals *sc*, *sc'*, *sc''* and the preliminary signals *sp*, *sp'*; (at the top of Figure 24) as well as the return signal *sr* (Figure 13*b* attached hereto); the other serving for transmitting the switching signals *sa*, *sa'*, *sa''* (with 18 carrier frequencies $f1, f2 \ldots f18$ as in harmonic telegraphic systems) with 18 carrier-current channels. The above described method thus permits the transmission of three series of telegrams with only two telephonic channels (instead of three).

I claim:

1. In a system for the high speed transmission of telegraph signals, a transmitting station, a receiving station, a line connecting said stations, signal forming means at said transmitting station comprising a signaling cylinder, means for rotating said cylinder, said cylinder being adapted to perform one complete rotation for the transmission of one character, said cylinder being provided on its periphery with a preliminary control projecting contact adapted to close a contact initiating the transmission of a preliminary signal upon the initiation of the rotation of said cylinder for each character, said cylinder further being provided on its periphery with a projection, a keyboard comprising individual co-linearly positioned contacts for each character depressible into a separate individual position on said cylinder and into engagement with a separate individual point on said projection, whereby, after the preliminary signal upon the initiation of the rotation of said cylinder, a telegraphic signal constituted by a single impulse and representing the depression of each key of said keyboard and determined by the particular key depressed is sent, a magnetic recorder for recording said telegraphic impulses and sending them later at a high speed on said line, said receiving station comprising an electro-optical relay for translating said transmitted impulses into luminous characters photographed on film, and synchronizing means for synchronizing the operation of said electro-optical relay with the transmission of said recorded telegraphic signals.

2. In a system for the high speed transmission of telegraph signals, a transmitting station, a receiving station, a line connecting said stations, signal forming means at said transmitting station comprising a signaling cylinder, means for rotating said cylinder, said cylinder being adapted to perform one complete rotation for the transmission of one character, said cylinder being provided on its periphery with a preliminary control projecting contact adapted to close a contact initiating the transmission of a preliminary signal upon the initiation of the rotation of said cylinder for each character, said cylinder further being provided on its periphery with a helicoidal raised rib projection, a keyboard comprising individual co-linearly positioned contacts for each character depressible into a separate individual position on said cylinder and into engagement with a separate individual point on said helicoidal projection, whereby the elapsed time between the transmission of the preliminary signal upon the initiation of the rotation of said cylinder and the transmission of the telegraphic signal constituted by a single impulse and representing the depression of each key of said keyboard is determined by the particular key depressed, a magnetic recorder for recording said telegraphic impulses and sending them later at a high speed on said line, said receiving station comprising an electro-optical relay for translating said transmitted impulses into luminous characters photographed on film, and synchronizing means for synchronizing the operation of said electro-optical relay with the transmission of said recorded telegraphic signals.

3. In a system for the high speed transmission of telegraph signals, a transmitting station, a receiving station, a line connecting said stations, signal forming means at said transmitting station comprising a signaling cylinder, means for rotating said cylinder, said cylinder being adapted to perform one complete rotation for the transmission of one character, said cylinder being provided on its periphery with a preliminary control projecting contact adapted to close a contact initiating the transmission of a preliminary signal upon the initiation of the rotation of said cylinder for each character, said cylinder further being provided on its periphery with a helicoidal raised rib projection, a keyboard comprising individual co-linearly positioned contacts for each character depressible into a separate individual position on said cylinder and into engagement with a separate individual point on said helicoidal projection, whereby the elapsed time between the transmission of the preliminary signal upon the initiation of the rotation of said cylinder and the transmission of the telegraphic signal constituted by a single impulse and representing the depression of each key of said keyboard is determined by the particular key depressed, said transmitting station further comprising means for sending a preliminary discriminating signal of a first determined frequency corresponding to letters or a preliminary signal of a second determined frequency corresponding to non-letter characters, a magnetic recorder for recording said telegraphic impulses and sending them later at a high speed on said line, said receiving station having an electro-optical relay for translating said transmitted impulses into luminous characters photographed on film, and comprising a double oscillograph having in the same envelope separated by a partition two cathode-ray beams each having a control grid and being associated with one part of a fluorescent screen, a first decoding panel for letters mounted in juxtaposition to said first part of the screen, and a second decoding panel for characters other than letters mounted in juxtaposition to the second part of the said screen, a pair of band pass filters inserted in the connection to the line at said receiving station and respectively tuned to the letter discriminating signal and to the discriminating signal for characters other than letters, and a current inverting unit having its input connected to the outputs of said filters, and connections from the output of said inverter unit adapted to apply an unblocking voltage on the control grid of one or the other of said two cathode-ray beams according to which kind of a discriminating signal is received, and synchronizing means for synchronizing the operation of said electro-optical relay with the transmission of said recorded telegraphic signals.

4. A system according to claim 3, said electro-optical relay comprising an optical system including a first lens having its focus on the photographic film and a second lens having its focus on a decoding panel and further comprising a plurality of individual lens elements corresponding respectively to individual characters on said decoding panel.

5. In a system for the high speed transmission of telegraph signals, a transmitting station, a receiving station, a line connecting said stations, signal forming means at said transmitting station comprising a signaling cylinder, means for rotating said cylinder, said cylinder being adapted to perform one complete rotation for the transmission of one character, said cylinder being provided on its periphery with a preliminary control projecting contact adapted to close a contact initiating the transmission of a preliminary signal upon the initiation of the rotation of said cylinder for each character, said cylinder further being provided with a cylindrical projection, except on one small part of said cylinder corresponding to said control projecting contact, a keyboard comprising individual co-linearly positioned contacts for each character depressible into a separate individual position on said cylinder and into engagement with said cylindrical projection, and a potentiometer associated with a source of electrical current, whereby the intensity of the telegraphic signal constituted by a single impulse and representing the depression of each key of said keyboard is determined by the particular key depressed, a magnetic recorder for recording said telegraphic impulses and sending them later at a high speed on said line, and said receiving station comprising an electro-optical relay for translating said transmitting impulses into luminous characters photographed on film, and synchronizing means for synchronizing the operation of said electro-optical relay with the transmission of said recorded telegraphic signals.

6. In a system for the high speed transmission of telegraph signals, a transmitting station, a receiving station, a line connecting said stations, signal forming means at said transmitting station comprising a signaling cylinder, means for rotating said cylinder, said cylinder being adapted to perform one complete rotation for the transmission of one character, said cylinder being provided on its periphery with a preliminary control projecting contact adapted to close a contact initiating the transmission of a preliminary signal upon the initiation of the rotation of said cylinder for each character, said cylinder further being provided with a cylindrical projection, except on one small part of said cylinder corresponding to said control projecting contact, a keyboard comprising individual co-linearly positioned contacts for each character depressible into a separate individual position on said cylinder and into engagement with said cylindrical projection, and a potentiometer associated with a source of electrical current, whereby the intensity of the telegraphic signal constituted by a single impulse and representing the depression of each key of said keyboard is determined by the particular key depressed, said transmitting station further comprising means for sending a preliminary discriminating signal of a first determined frequency corresponding to letters or a preliminary signal of a second determined frequency corresponding to non-letter characters, a magnetic recorder for recording said telegraphic impulses and sending them later at a high speed on said line, and said receiving station comprising an electro-optical relay for translating said transmitting impulses into luminous characters photographed on film and comprising a double oscillograph having in the same envelope separated by a partition two cathode-ray beams each having a control grid and being associated with one part of a fluorescent screen, a first decoding panel for letters mounted in juxtaposition to said first part of the screen, and a second decoding panel for characters other than letters mounted in juxtaposition to the second part of said screen, a pair of band-pass filters inserted in the connection to the line at said receiving station and respectively tuned to the letter discriminating signal and to the discriminating signal for characters other than letters, and a current inverting unit having its input connected to the outputs of said filters, and connections from the output of said inverter unit adapted to apply an unblocking voltage on the control grid of one or the other of said two cathode-ray beams according to which kind of a discriminating signal is received, and synchronizing means for synchronizing the operation of said electro-optical relay with the transmission of said recorded telegraphic signals.

7. A system according to claim 6, said electro-optical relay comprising an optical system including a first lens having its focus on the photographic film and a second lens having its focus on a decoding panel and further comprising a plurality of individual lens elements corresponding respectively to individual characters on said decoding panel.

GEORGES VALENSI.

REFERENCES CITED

The following references are of record in the file of this patent:

UNITED STATES PATENTS

| Number | Name | Date |
|---|---|---|
| 581,815 | Eaton | May 9, 1897 |
| 1,933,376 | Kain | Oct. 31, 1933 |
| 1,947,249 | Busch | Feb. 13, 1934 |
| 2,046,328 | Kleinschmidt | July 7, 1936 |
| 2,047,863 | Finch | July 14, 1936 |
| 2,074,037 | Watson | Mar. 16, 1937 |
| 2,082,692 | Finch | June 1, 1937 |
| 2,083,203 | Schlesinger | June 8, 1937 |
| 2,104,544 | Lemon | Jan. 4, 1938 |
| 2,133,811 | Finch | Oct. 8, 1938 |
| 2,165,307 | Skellett | July 11, 1939 |
| 2,171,150 | Shelby | Aug. 29, 1939 |
| 2,174,691 | Doty | Oct. 3, 1939 |
| 2,278,460 | Milhose | Apr. 7, 1942 |
| 2,301,199 | Bruce | Nov. 10, 1942 |
| 2,307,505 | Heinmets | Jan. 5, 1943 |
| 2,313,209 | Valensi | Nov. 9, 1943 |
| 2,360,719 | Reisz | Oct. 17, 1944 |
| 2,379,880 | Burgess | July 10, 1945 |